(12) United States Patent
Piontek et al.

(10) Patent No.: US 11,287,076 B2
(45) Date of Patent: Mar. 29, 2022

(54) ENCAPSULATION SLEEVE GASKET ASSEMBLY WITH DETACHABLE INNER LAYER

(71) Applicant: Total Piping Solutions, Inc., Olean, NY (US)

(72) Inventors: Daryl M. Piontek, Great Valley, NY (US); Richard Fontes, Springville, NY (US)

(73) Assignee: Total Piping Solutions, Inc., Olean, NY (US)

( * ) Notice: Subject to any disclaimer, the term of this patent is extended or adjusted under 35 U.S.C. 154(b) by 0 days.

(21) Appl. No.: 16/509,205

(22) Filed: Jul. 11, 2019

(65) Prior Publication Data

US 2019/0331283 A1 Oct. 31, 2019

Related U.S. Application Data

(63) Continuation-in-part of application No. 16/271,145, filed on Feb. 8, 2019, which is a continuation-in-part of application No. 15/829,645, filed on Dec. 1, 2017.

(Continued)

(51) Int. Cl.
*F16L 5/02* (2006.01)
*F16L 17/04* (2006.01)
(Continued)

(52) U.S. Cl.
CPC ............ *F16L 55/18* (2013.01); *F16L 21/065* (2013.01); *F16J 15/02* (2013.01); *F16J 15/022* (2013.01);
(Continued)

(58) Field of Classification Search
CPC ..... F16L 19/0218; F16L 21/08; F16L 23/024; F16L 37/101; F16L 37/124; F16L 55/172;
(Continued)

(56) References Cited

U.S. PATENT DOCUMENTS 2,421,659 A  6/1947 Sutton
2,517,290 A  1/1950 De Moude et al.
(Continued)

FOREIGN PATENT DOCUMENTS

WO  9533948 A1  12/1995
WO  2015145377 A1  10/2015

OTHER PUBLICATIONS

United States Patent and Trademark Office (ISA/US), International Search Report and Written Opinion from PCT/US2020/16111, dated Apr. 9, 2020.
(Continued)

*Primary Examiner* — Matthew Troutman
*Assistant Examiner* — William S. Choi
(74) *Attorney, Agent, or Firm* — Harter Secrest & Emery LLP

(57) ABSTRACT

A coupling assembly having first and second sleeves configured to be tightened to a fluid conduit, a radial-split gasket configured to be positioned between the sleeves and the fluid conduit and having an outer gasket layer and a separate inner gasket layer configured to be selectively disengaged from each other, the outer gasket layer having a radial gap defined by first and second radial side wall gap surfaces, the inner gasket layer having a radial gap and a radial insert configured to be received in the radial gap of the outer gasket layer between the first and second radial side wall gap surfaces.

13 Claims, 25 Drawing Sheets

Related U.S. Application Data

(60) Provisional application No. 62/429,611, filed on Dec. 2, 2016.

(51) Int. Cl.

| | |
|---|---|
| *F16L 17/025* | (2006.01) |
| *F16L 21/06* | (2006.01) |
| *F16L 55/18* | (2006.01) |
| *F16L 55/172* | (2006.01) |
| *F16J 15/02* | (2006.01) |
| *F16J 15/10* | (2006.01) |
| *F16J 15/12* | (2006.01) |
| *F16J 15/06* | (2006.01) |

(52) U.S. Cl.
CPC .......... *F16J 15/025* (2013.01); *F16J 15/067* (2013.01); *F16J 15/10* (2013.01); *F16J 15/104* (2013.01); *F16J 15/12* (2013.01); *F16L 5/02* (2013.01); *F16L 17/025* (2013.01); *F16L 17/04* (2013.01); *F16L 21/06* (2013.01); *F16L 55/172* (2013.01)

(58) Field of Classification Search
CPC ....... F16L 25/12; F16L 55/175; F16L 21/065; F16L 17/025; F16L 17/03; F16L 17/035; F16L 17/04; F16L 17/073; F16L 17/08; F16L 19/06; F16L 19/12; F16L 21/02; F16L 21/025; F16L 21/06; F16L 27/1133; F16L 23/16; F16L 5/02; F16L 25/0054; F16L 33/18; F16L 47/08; F16L 58/18; F16J 15/05; F16J 15/025; F16J 15/022; F16J 15/10; F16J 15/12; F16J 15/067; F16J 15/104
USPC ....... 285/367, 15, 16, 66, 65, 110, 111, 417, 285/419, 910, 373, 236, 421, 379, 364; 277/602, 603, 604, 607, 608, 609, 612, 277/626, 631
See application file for complete search history.

(56) References Cited

U.S. PATENT DOCUMENTS

| | | | |
|---|---|---|---|
| 2,761,709 A * | 9/1956 | Gilbert, Sr. | ................... 285/910 |
| 3,150,876 A | 9/1964 | Lafferty | |
| 4,391,458 A | 7/1983 | Blakeley | |
| 5,168,210 A | 12/1992 | Thus | |
| 5,203,594 A | 4/1993 | Straub | |
| 5,293,556 A | 3/1994 | Hill et al. | |
| 5,722,294 A * | 3/1998 | Kobayashi | |
| 5,776,351 A | 7/1998 | McGinness et al. | |
| 6,070,914 A | 6/2000 | Schmidt | |
| 6,168,210 B1 | 1/2001 | Bird | |
| 7,390,026 B2 * | 6/2008 | Noda | ...................... F16L 17/04 |
| | | | 285/367 |
| 7,527,306 B2 * | 5/2009 | Ben-Hohn | |
| 8,096,585 B2 * | 1/2012 | Vitel | ...................... F16L 21/08 |
| | | | 285/110 |
| 8,096,586 B2 | 1/2012 | Vitel | |
| 8,528,945 B2 * | 9/2013 | Bird | ........................... 285/110 |
| 8,776,351 B2 | 7/2014 | Bird et al. | |
| 8,894,100 B2 | 11/2014 | Eaton | |
| 8,967,422 B2 | 3/2015 | Volkmann | |
| 9,310,002 B2 | 4/2016 | Chiproot | |
| 2004/0036233 A1 | 2/2004 | Schleth | |
| 2005/0230972 A1 | 10/2005 | Owen et al. | |
| 2006/0061090 A1 | 3/2006 | Krausz et al. | |
| 2010/0023761 A1 | 9/2010 | Howard et al. | |
| 2010/0327576 A1 | 12/2010 | Linhorst | |
| 2012/0019296 A1 | 8/2012 | Minich et al. | |
| 2012/0205909 A1 | 8/2012 | Bird | |
| 2013/0119658 A1 | 5/2013 | Bird et al. | |
| 2014/0001709 A1 | 1/2014 | Chiproot et al. | |
| 2014/0029953 A1 | 1/2014 | Otte et al. | |
| 2018/0156367 A1 | 6/2018 | Piontek et al. | |

OTHER PUBLICATIONS

Korean Intellectual Property Office (ISA/KR), International Search Report and Written Opinion from PCT/US2017/064289, dated Mar. 14, 2018.

* cited by examiner

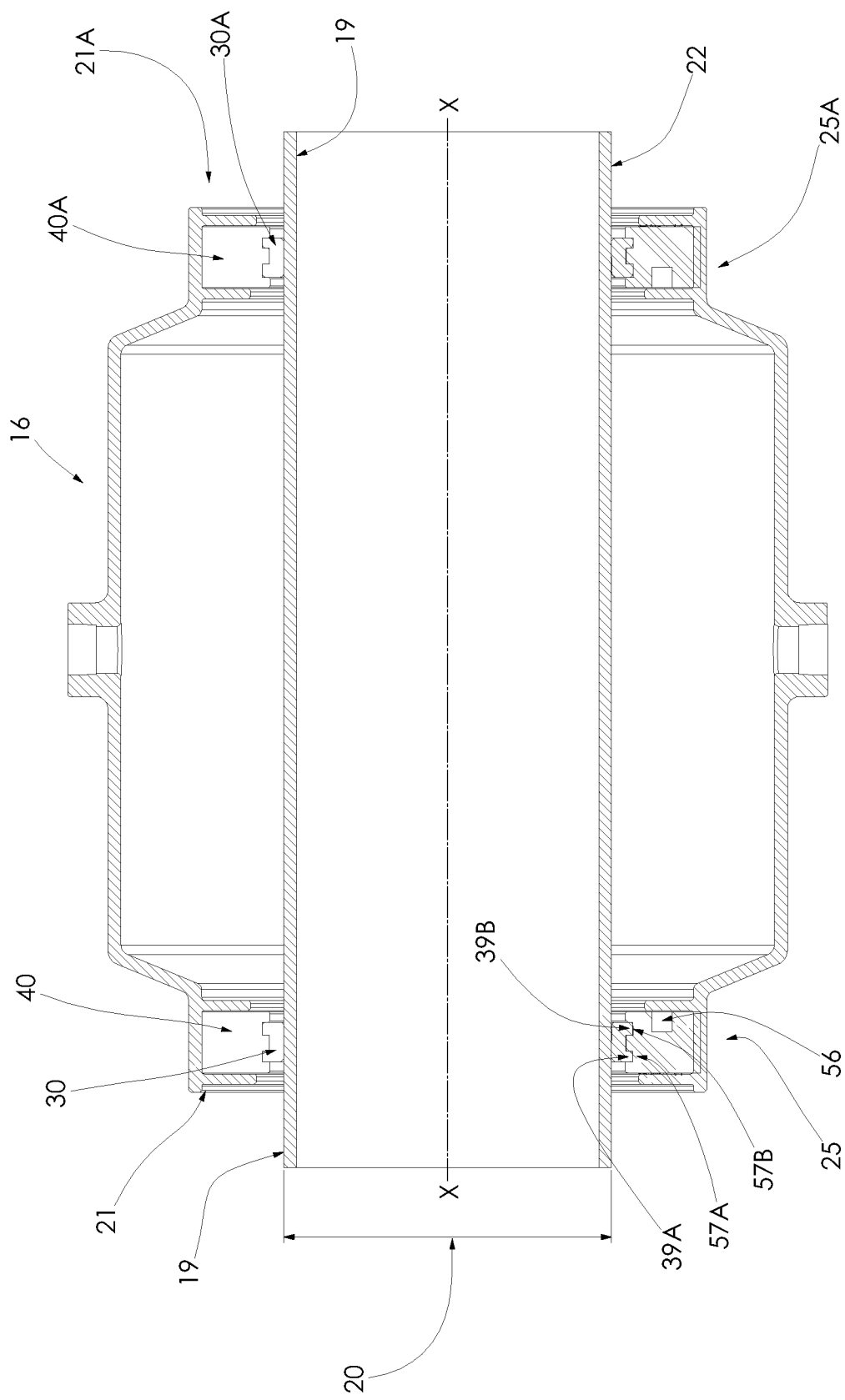

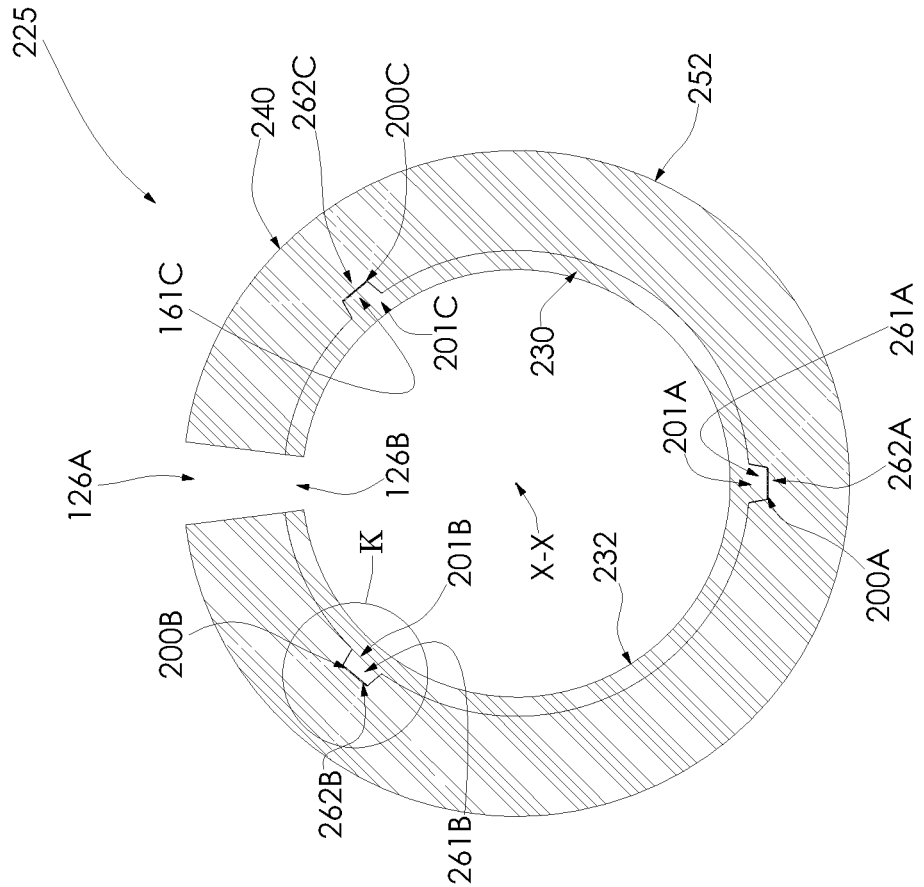

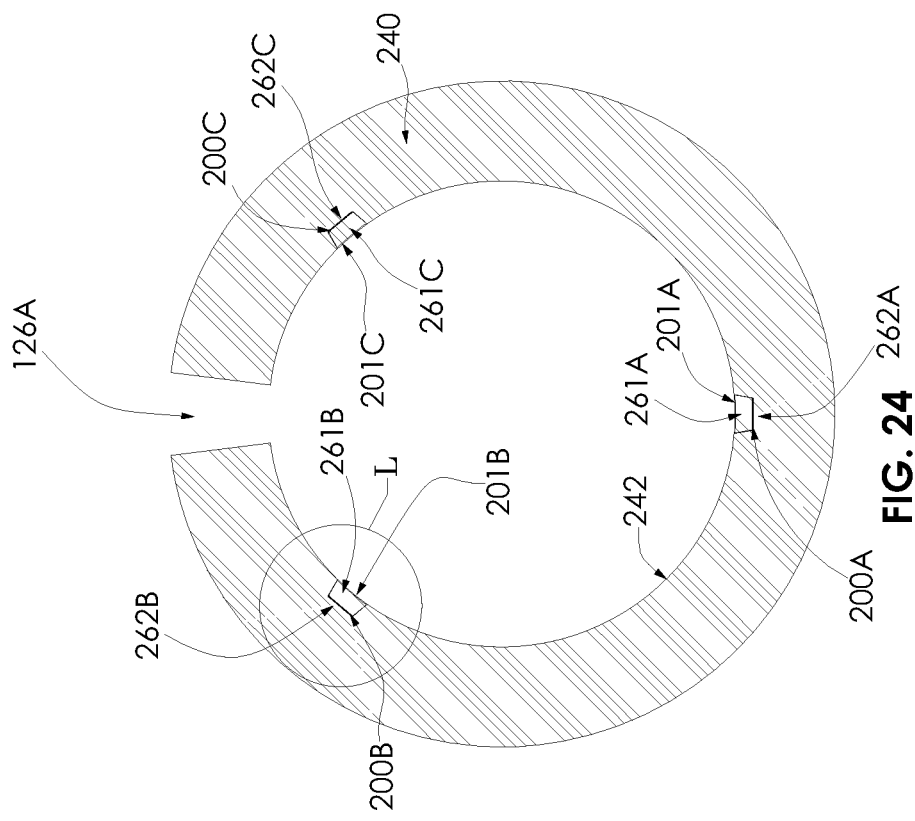
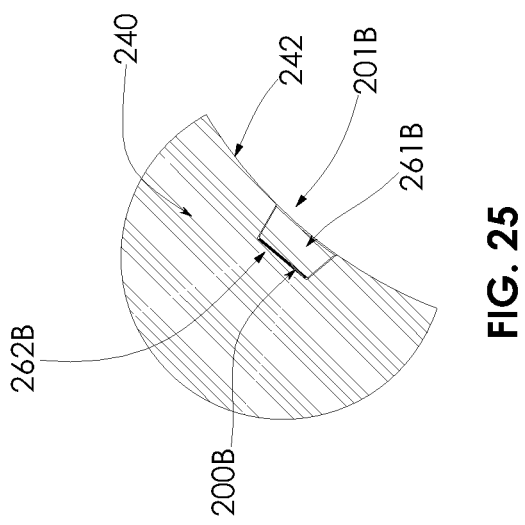

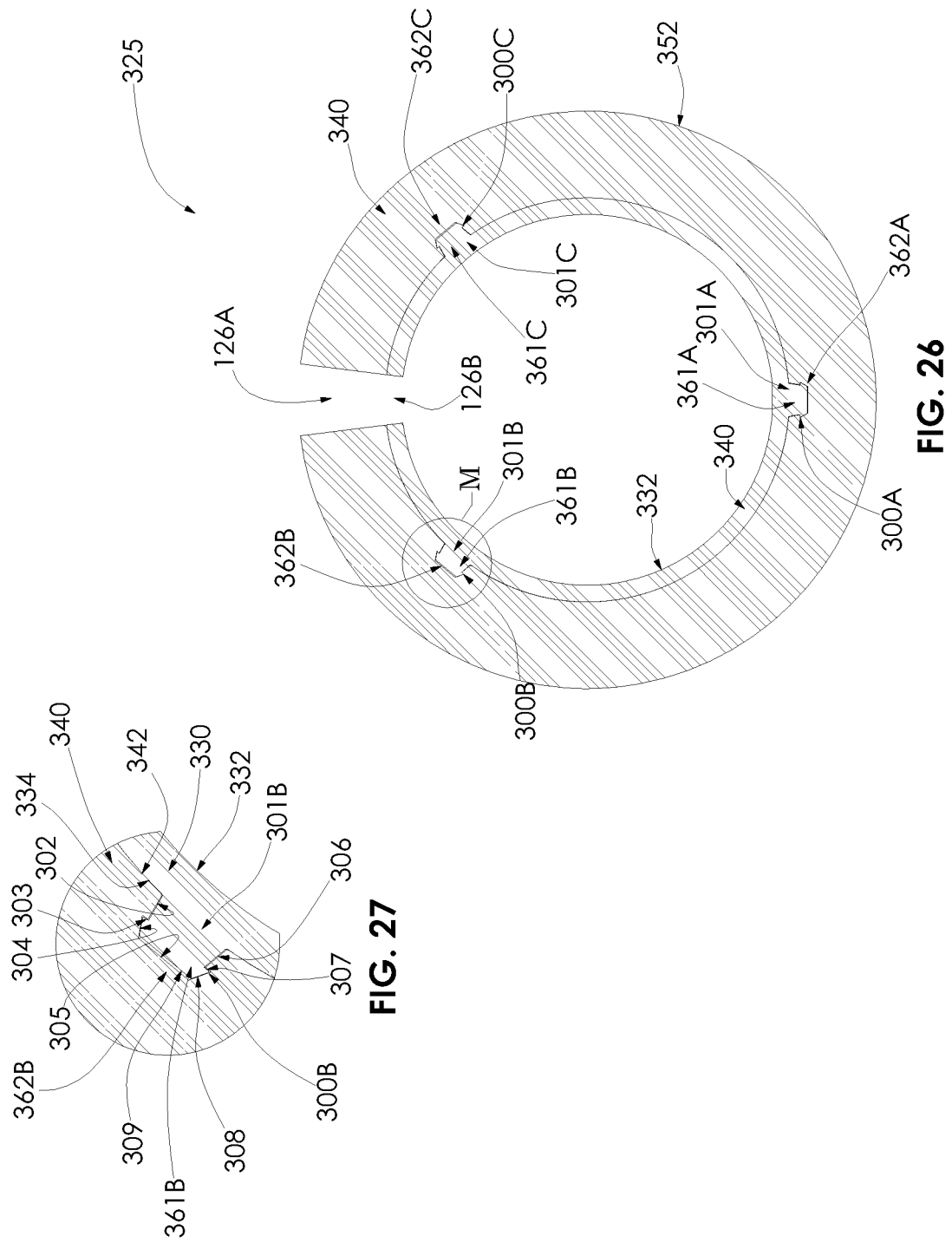

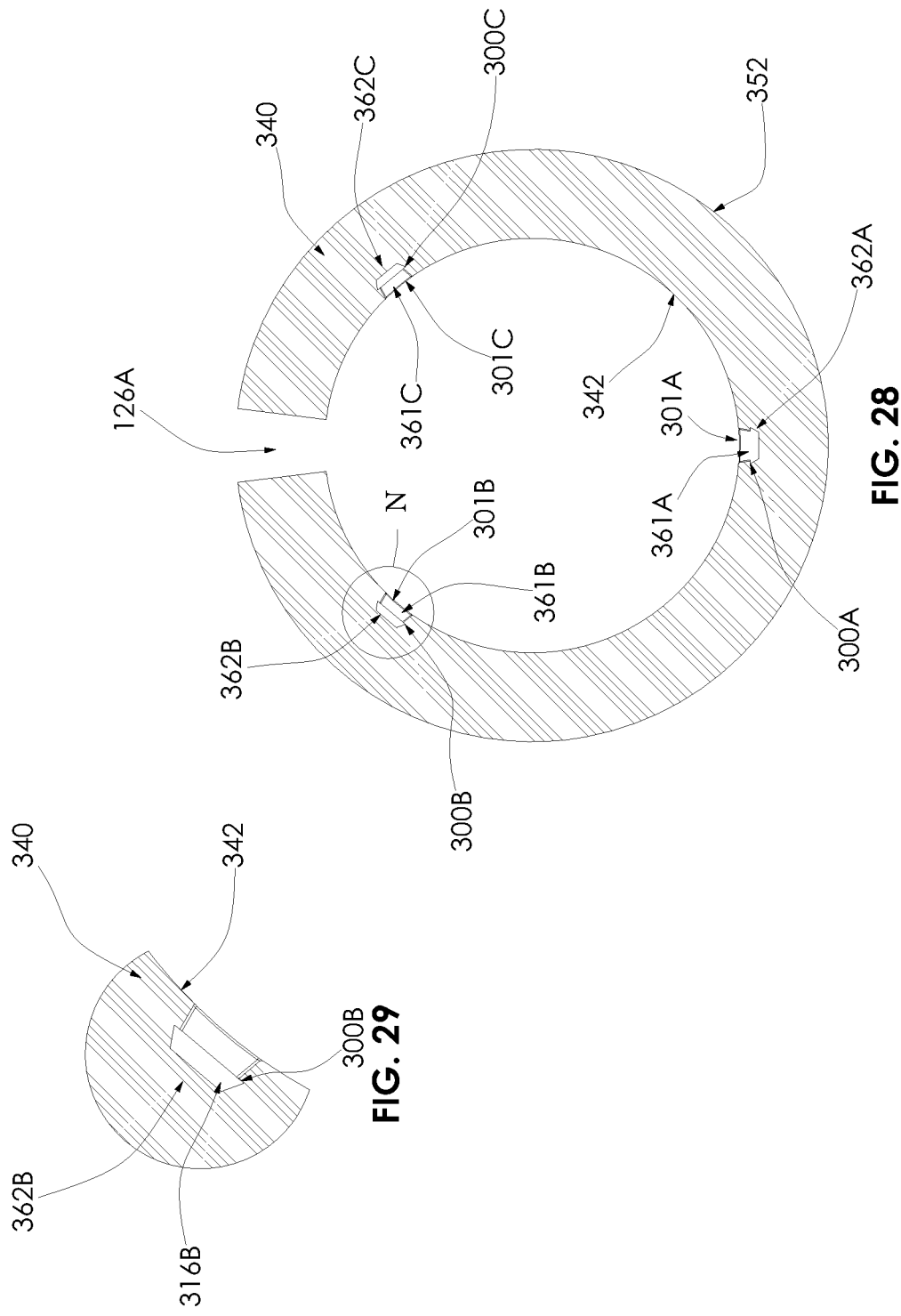

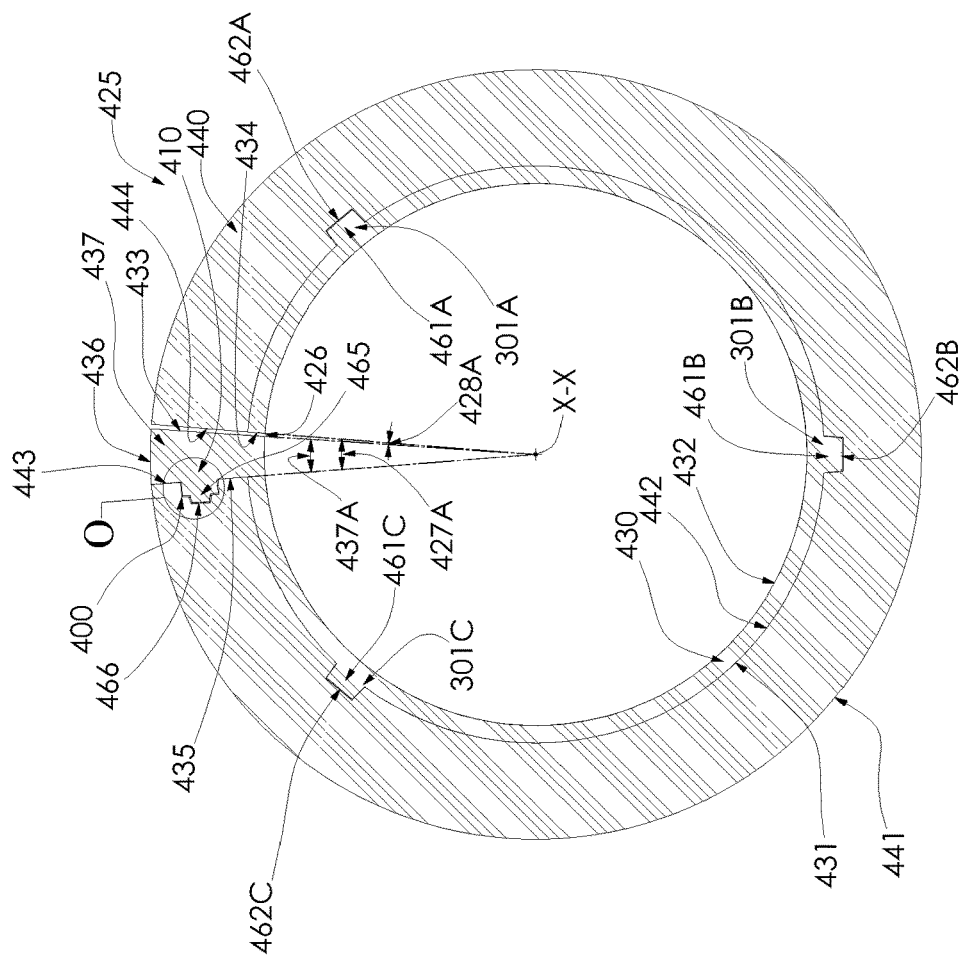
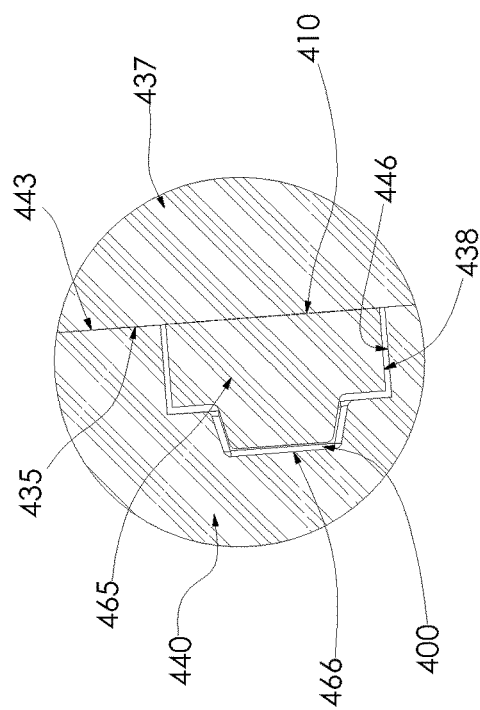
FIG. 33
FIG. 34

ENCAPSULATION SLEEVE GASKET ASSEMBLY WITH DETACHABLE INNER LAYER

TECHNICAL FIELD

The present invention relates generally to the field of fluid conduit repair and coupling sleeves, and more particularly to an improved pipe coupling sleeve and gasket assembly.

BACKGROUND ART

Split repair and encapsulating sleeves or clamps are used in the repair or reinforcement of pipes. For example, conventional assemblies for coupling and sealing adjacent ends of two adjacent pipe sections include a sleeve, shell or collar with each pipe end extending into a respective end of the sleeve. Gaskets are placed between the sleeve and each pipe end, respectively, such that tightening the sleeve to the pipe sections compresses the gasket against the pipe ends, thereby sealing the pipe coupling to the pipes.

Some split ring type pipe couplings utilize a gasket having a plurality of layers integrally connected to each other. The inner layer typically defines an opening adapted to receive small diameter pipe ends and, when it is desired to couple a larger diameter pipe end than cannot fit through the inner layer opening, one or more of the layers may be manually removed from the gasket to increase the size of the gasket opening to accommodate the larger diameter pipe.

U.S. Pat. No. 6,168,210, entitled "Pipe Coupling," discloses a sleeve, flanges and gaskets that are coupled together via bolts to compress the gaskets against pipe ends as the flanges are drawn towards each other. U.S. Pat. No. 4,391,458, entitled "Pipe Coupling With Gasket Locating Means," discloses a pipe coupling having a split housing surrounding a split-ring gasket.

U.S. Patent Application Publication No. 2010/0327576, entitled "Pipe Coupler and Gasket With Positive Retention and Sealing Capability," discloses a coupler which provides positive retention of a gasket about the circumference of the coupler. U.S. Pat. No. 8,776,351, entitled "Split-Ring Gland Pipe Coupling With Corrugated Armor," discloses a pipe coupling for coupling adjacent ends of a pair of pipes that includes a sleeve, a split-ring gland positioned around one of the ends of the sleeve, and an annular gasket positioned within the split-ring gland and configured to be compressed by the split-ring gland for sealing one pipe end to the sleeve.

BRIEF SUMMARY OF THE INVENTION

With parenthetical reference to corresponding parts, portions or surfaces of the disclosed embodiment, merely for the purposes of illustration and not by way of limitation, an improved conduit coupling assembly (115) configured to clamp to a fluid conduit (19, 119) oriented about a longitudinal axis (x-x) is provided comprising: a first arcuate sleeve member (16A); a second arcuate sleeve member (16B); a connecting assembly (18, 28A, 28B) coupling the first sleeve member to the second sleeve member and configured to tighten the first and second sleeve members to a fluid conduit from a non-actuated position to a tightened position; an arcuate radial-split gasket (125A, 125B) configured to be positioned between the first and second sleeve members and the fluid conduit; the gasket comprising a radial-split arcuate outer gasket layer (140) and a separate radial-split arcuate inner gasket layer (130); the outer gasket layer having an inner circumferential surface (142, 146, 150) and an outer circumferential surface (152, 156); the inner gasket layer having an inner circumferential surface (132) and an outer circumferential surface (134A, 134B, 134C); the inner and outer gasket layers configured to be selectively disengaged from each other; and the inner circumferential surface of the outer gasket layer and/or the outer circumferential surface of the inner gasket layer comprising a plurality of circumferentially spaced retaining protrusions (161A, 161B, 161C) interfacing between the inner and outer gasket layers to maintain angular alignment (166A, 166B, 166C) of the inner and outer gasket layers about the longitudinal axis.

The outer circumferential surface of the inner gasket layer may comprise a plurality of radially protruding circumferentially spaced spokes (161A, 161B, 161C) interfacing with the outer gasket layer to maintain the angular alignment of the inner and outer gasket layers about the longitudinal axis. The inner circumferential surface of the outer gasket layer may comprise a plurality of circumferentially spaced cavities (162A, 162B, 162C) configured to receive the protruding circumferentially spaced spokes of the inner gasket layer to maintain the angular alignment of the outer gasket layer and the inner gasket layer about the longitudinal axis. The circumferentially spaced spokes of the inner gasket layer and the circumferentially spaced cavities of the outer gasket layer may be correspondingly located about the longitudinally extending axis and in mating engagement to maintain the angular alignment of the inner and outer gasket layers about the longitudinal axis such that the radial-split (126B) of the outer gasket layer and the radial split (126A) of the inner gasket layer are aligned on a common radius (165) about the longitudinal axis.

The outer circumferential surface of the outer gasket layer may comprise an inwardly extending circumferential groove (160) therein. The annular groove may have a circumferential arc length about the longitudinal axis substantially less than the outer circumferential surface of the outer gasket layer about the longitudinal axis. The outer gasket layer may have a maximum axial width (127B) and the inner gasket layer may have a maximum axial width (127A) less than the maximum axial width of the outer gasket layer.

The inner circumferential surface of the outer gasket layer may comprise a plurality of inwardly extending circumferential channels (157A, 157B) therein; the outer circumferential surface of the inner gasket layer may comprise a plurality of outwardly extending circumferential splines (139A, 139B); and the circumferential channels of the outer gasket layer may be configured to receive the circumferential splines of the inner gasket layer.

In another aspect, a conduit coupling assembly (15) configured to clamp to a fluid conduit oriented about a longitudinal axis is provided comprising: a first arcuate sleeve member; a second arcuate sleeve member; a connecting assembly coupling the first sleeve member to the second sleeve member and configured to tighten the first and second sleeve members to a fluid conduit from a non-actuated position to a tightened position; a gasket ring (25) configured to be positioned around a fluid conduit between the first and second sleeve members and the fluid conduit; the gasket comprising an outer gasket ring (40) and a separate inner gasket ring (30); the outer gasket ring having an inner annular surface (42, 46, 50) and an outer annular surface (52); the inner gasket ring having an inner annular surface (32) and an outer annular surface (36); the inner and outer gasket rings configured to be selectively disengaged from each other; and the outer gasket ring having a maximum axial width (27B) and the inner gasket ring having a maximum axial width (27A) less than the maximum axial width of the outer gasket ring.

The outer circumferential surface of the outer gasket ring may comprise an inwardly extending circumferential groove therein. The inner circumferential surface of the outer gasket ring may comprise a plurality of inwardly extending circumferential channels (57A, 57B) therein; the outer circumferential surface of the inner gasket ring may comprise a plurality of outwardly extending circumferential splines (39A, 39B); and the circumferential channels of the outer gasket ring may be configured to receive the circumferential splines of the inner gasket ring.

In another aspect, a gasket (125, 125A) configured to clamp to a fluid conduit oriented about a longitudinal axis is provided comprising: a radial-split arcuate outer gasket layer (140) and a separate radial-split arcuate inner gasket layer (130); the outer gasket layer having an inner circumferential surface (142, 146, 150) and an outer circumferential surface (152, 156); the inner gasket layer having an inner circumferential surface (132) and an outer circumferential surface (134A, 134B, 134C); the inner and outer gasket layers configured to be selectively disengaged from each other; and the inner circumferential surface of the outer gasket layer and/or the outer circumferential surface of the inner gasket layer comprising a plurality of circumferentially spaced retaining protrusions (161A, 161B, 161C) interfacing between the inner and outer gasket layers to maintain angular alignment of the inner and outer gasket layers about the longitudinal axis.

The outer circumferential surface of the inner gasket layer may comprise a plurality of radially protruding circumferentially spaced spokes (161A, 161B, 161C) interfacing with the outer gasket layer to maintain the angular alignment of the inner and outer gasket layers about the longitudinal axis. The inner circumferential surface of the outer gasket layer may comprise a plurality of circumferentially spaced cavities (162A, 162B, 162C) configured to receive the protruding circumferentially spaced spokes of the inner gasket layer to maintain the angular alignment of the outer gasket layer and the inner gasket layer about the longitudinal axis. The circumferentially spaced spokes of the inner gasket layer and the circumferentially spaced cavities of the outer gasket layer may be correspondingly located about the longitudinally extending axis and in mating engagement to maintain the angular alignment of the inner and outer gasket layers about the longitudinal axis such that the radial-split (126B) of the outer gasket layer and the radial split (126A) of the inner gasket layer are aligned on a common radius (165) about the longitudinal axis.

The outer circumferential surface of the outer gasket layer may comprise an inwardly extending circumferential groove (16) therein. The circumferential groove may have a circumferential arc length about the longitudinal axis substantially less than the outer circumferential surface of the outer gasket layer about the longitudinal axis. The outer gasket layer may have a maximum axial width (27B) and the inner gasket layer may have a maximum axial width (27A) less than the maximum axial width of the outer gasket layer.

The inner circumferential surface of the outer gasket layer may comprise a plurality of inwardly extending circumferential channels (157A, 157B) therein; the outer circumferential surface of the inner gasket layer may comprise a plurality of outwardly extending circumferential splines (139A, 139B); and the circumferential channels of the outer gasket layer may be configured to receive the circumferential splines of the inner gasket layer.

In another aspect, a conduit coupling assembly configured to clamp to a fluid conduit (19, 119) oriented about a longitudinal axis (x-x) is provided comprising: a first arcuate sleeve member (16A); a second arcuate sleeve member (16B); a connecting assembly (18, 28A, 28B) coupling the first sleeve member to the second sleeve member and configured to tighten the first and second sleeve members to a fluid conduit from a non-actuated position to a tightened position; an arcuate radial-split gasket (225, 325) configured to be positioned between the first and second sleeve members and the fluid conduit; the gasket comprising a radial-split arcuate outer gasket layer (240, 340) and a separate radial-split arcuate inner gasket layer (230, 330); the outer gasket layer having an inner circumferential surface (242, 342) and an outer circumferential surface (252, 352); the inner gasket layer having an inner circumferential surface (232, 332) and an outer circumferential surface (234, 334); the inner and outer gasket layers configured to be selectively engaged with each other; the outer circumferential surface of the inner gasket layer comprising a plurality of circumferentially spaced retaining protrusions (261A, 261B, 261C, 361A, 361B, 361C) interfacing with the outer gasket layer; each of the plurality of circumferentially spaced retaining protrusions having an engagement portion (204, 205, 306, 307, 308, 309) and a separation portion (201A, 201B, 201C, 301A, 301B, 301C); the engagement portion of the retaining protrusions of the inner gasket layer connected to the outer gasket layer by a gasket layer connection (200A, 200B, 200C, 300A, 300B, 300C); the gasket layer connection and the separation portion of the retaining protrusions of the inner gasket layer configured such that the engagement portion of the retaining protrusions will separate from the inner gasket layer at the separation portion of the retaining protrusions under an applied separation force between the inner gasket layer and the outer gasket layer prior to the engagement portion of the retaining protrusions separating from the outer gasket layer at the gasket layer connection.

The gasket layer connection may comprise an adhesive (200A, 200B, 200C) between a retaining surface (205) of the engagement portion of the retaining protrusions of the inner gasket layer and the outer gasket layer. The inner circumferential surface of the outer gasket layer may comprise a plurality of circumferentially spaced cavities (262A, 262B, 262C) configured to receive the retaining protrusions of the inner gasket layer, and the gasket layer connection may comprise an adhesive (200A, 200B, 200C) between the retaining surface (205) of the engagement portion of the retaining protrusions of the inner gasket layer and an inner cavity surface (203) of the cavities of the outer gasket layer.

The gasket layer connection may comprise a mechanical connection (300A, 300B, 300C) between the engagement portion of the retaining protrusions of the inner gasket layer and the outer gasket layer. The inner circumferential surface of the outer gasket layer may comprise a plurality of circumferentially spaced cavities (362A, 362B, 362C) configured to receive the retaining protrusions of the inner gasket layer, and the gasket layer connection may comprise a retaining surface overlap (300A, 300B, 300C) between a retaining surface (307) of the engagement portion of the retaining protrusions of the inner gasket layer and a cavity surface (303) of the cavities of the outer gasket layer that restrains radial movement of the retaining protrusions of the inner gasket layer from the cavities of the outer gasket layer. The retaining surface overlap may comprise an annular shoulder (303) of the cavity surface of the cavities facing an opposed annular flange (307) of the retaining surface of the engagement portion of the retaining protrusions.

The plurality of circumferentially spaced retaining protrusions may comprise a plurality of radially protruding circumferentially spaced spokes interfacing with the outer gasket layer to maintain the angular alignment of the inner and outer gasket layers about the longitudinal axis. The inner circumferential surface of the outer gasket layer may comprise a plurality of circumferentially spaced cavities configured to receive the protruding circumferentially spaced spokes of the inner gasket layer to maintain the angular alignment of the outer gasket and the inner gasket layer about the longitudinal axis. The circumferentially spaced spokes of the inner gasket layer and the circumferentially spaced cavities of the outer gasket layer may be correspondingly located about the longitudinally extending axis and are in mating engagement to maintain the angular alignment of the inner and outer gasket layers about the longitudinal axis such that the radial-split of the outer gasket layer and the radial split of the inner gasket layer are aligned on a common radius about the longitudinal axis.

In another aspect, a conduit coupling assembly configured to clamp to a fluid conduit (19, 119) oriented about a longitudinal axis (x-x) is provided comprising: a first arcuate sleeve member (16A); a second arcuate sleeve member (16B); a connecting assembly (18, 28A, 28B) coupling the first sleeve member to the second sleeve member and configured to tighten the first and second sleeve members to a fluid conduit from a non-actuated position to a tightened position; an arcuate radial-split gasket (225, 325) configured to be positioned between the first and second sleeve members and the fluid conduit; the gasket comprising a radial-split arcuate outer gasket layer (240, 340) and a separate radial-split arcuate inner gasket layer (230, 330); the outer gasket layer having an inner circumferential surface (242, 342) and an outer circumferential surface (252, 352); the inner gasket layer having an inner circumferential surface (232, 332) and an outer circumferential surface (234, 334); the inner and outer gasket layers configured to be selectively engaged with each other; the inner circumferential surface of the outer gasket layer or the outer circumferential surface of the inner gasket layer comprising a plurality of circumferentially spaced retaining protrusions (261A, 261B, 261C, 361A, 361B, 361C) interfacing between the inner and outer gasket layers; each of the plurality of circumferentially spaced retaining protrusions having an engagement portion (204, 205, 306, 307, 308, 309) and a separation portion (201A, 201B, 201C, 301A, 301B, 301C); the engagement portion of the retaining protrusions of a subject outer or inner gasket layer connected to the other of the outer gasket layer or the inner gasket layer by a gasket layer connection (200A, 200B, 200C, 300A, 300B, 300C); the gasket layer connection and the separation portion of the retaining protrusions configured such that the engagement portion of the retaining protrusions will separate from the subject outer or inner gasket layer at the separation portion of the retaining protrusions under an applied separation force prior to the engagement portion of the retaining protrusions separating from the subject outer or inner gasket layer.

The gasket layer connection may comprise an adhesive (200A, 200B, 200C) between a retaining surface (205) of the engagement portion of the retaining protrusions of the subject outer or inner gasket layer and the other of the outer gasket layer or the inner gasket layer. The outer circumferential surface of the inner gasket layer may comprise the retaining protrusions, the inner circumferential surface of the outer gasket layer may comprise a plurality of circumferentially spaced cavities (262A, 262B, 262C) configured to receive the retaining protrusions of the inner gasket layer, and the gasket layer connection may comprise an adhesive (200A, 200B, 200C) between the retaining surface (205) of the engagement portion of the retaining protrusions of the inner gasket layer and an inner cavity surface (203) of the cavities of the outer gasket layer.

The gasket layer connection may comprise a mechanical connection (300A, 300B, 300C) between the engagement portion of the retaining protrusions of the subject outer or inner gasket layer and the other of the outer gasket layer or the inner gasket layer. The outer circumferential surface of the inner gasket layer may comprise the retaining protrusions, the inner circumferential surface of the outer gasket layer may comprise a plurality of circumferentially spaced cavities (362A, 362B, 362C) configured to receive the retaining protrusions of the inner gasket layer, and the gasket layer connection may comprise a retaining surface overlap (300A, 300B, 300C) between a retaining surface (307) of the engagement portion of the retaining protrusions of the inner gasket layer and a cavity surface (303) of the cavities of the outer gasket layer that restrains radial movement of the retaining protrusions of the inner gasket layer from the cavities of the outer gasket layer. The retaining surface overlap may comprise an annular shoulder (303) of the cavity surface of the cavities facing an opposed annular flange (307) of the retaining surface of the engagement portion of the retaining protrusions.

In another aspect, a conduit coupling assembly configured to clamp to a fluid conduit (19, 119) oriented about a longitudinal axis (x-x) is provided comprising: a first arcuate sleeve member (16A); a second arcuate sleeve member (16B); a connecting assembly (18, 28A, 28B) coupling the first sleeve member (16A) to the second sleeve member (16B) and configured to tighten the first and second sleeve members (16A, 16B) to a fluid conduit (19, 119) from a non-actuated position to a tightened position; an arcuate radial-split gasket (425) configured to be positioned between the first and second sleeve members (16A, 16B) and the fluid conduit (19, 119); the gasket (425) comprising an outer gasket layer (440) and a separate inner gasket layer (430); the inner and outer gasket layers (430, 440) configured to be selectively engaged with each other; the outer gasket layer (440) having an inner circumferential surface (442), an outer circumferential surface (441), and a radial gap (427) extending between the inner circumferential surface (442) and the outer circumferential surface (441) of the outer gasket layer (440); the radial gap (427) of the outer gasket layer (440) defined by a first radial side wall gap surface (443) and a second radial side wall gap surface (444); the inner gasket layer (430) having an inner circumferential surface (432), an outer circumferential surface (431), and a radial gap (428) extending between the inner circumferential surface (432) and the outer circumferential surface (431) of the inner gasket layer (430); the outer circumferential surface (431) of the inner gasket layer (430) configured to selectively engage the inner circumferential surface (442) of the outer gasket layer (440); the inner gasket layer (430) having a radial insert (437) defined by a first radial side wall insert surface (435) and a second radial side wall insert surface (433); the radial insert (437) of the inner gasket layer (430) extending radially outward from the outer circumferential surface (431) of the inner gasket layer (430); and the radial insert (437) of the inner gasket layer (430) configured to be received in the radial gap (427) of the outer gasket layer (440) between the first radial side wall gap surface (443) and the second radial side wall gap surface (444).

The first radial side wall insert surface (435) of the radial insert (437) of the inner gasket layer (430) or the first radial side wall gap surface (443) of the radial gap (427) of the outer gasket layer (440) may comprise a retaining protrusion (465) interfacing between the inner and outer gasket layers (430, 440). The first radial side wall insert surface (435) of the radial insert (437) of the inner gasket layer (430) or the first radial side wall gap surface (443) of the radial gap (427) of the outer gasket layer (440) may comprise a retaining cavity (466) configured to receive the retaining protrusion (465) of the other of the first radial side wall insert surface (435) of the radial insert (437) of the inner gasket layer (430) or the first radial side wall gap surface (443) of the radial gap (427) of the outer gasket layer (440). The coupling assembly may comprise an adhesive (400) between the retaining protrusion (465) and an inner cavity surface of the retaining cavity (466). The first radial side wall insert surface (435) of the radial insert (437) of the inner gasket layer (430) may comprise the retaining protrusion (465) and the first radial side wall gap surface (443) of the radial gap (427) of the outer gasket layer (440) may comprise the retaining cavity (466).

The coupling assembly may comprise a gasket layer connection (465, 466) between the first radial side wall insert surface (435) of the radial insert (437) of the inner gasket layer (430) and the first radial side wall gap surface (443) of the radial gap (427) of the outer gasket layer (440). The gasket layer connection may comprise a retaining surface overlap between an insert retaining surface (438) of the first radial side wall insert surface (435) of the radial insert (437) of the inner gasket layer (430) and a gap retaining surface (446) of the first radial side wall gap surface (443) of the radial gap (427) of the outer gasket layer (440) that restrains radial movement of the radial insert of the inner gasket layer from the radial gap of the outer gasket layer.

The inner circumferential surface of the outer gasket layer or the outer circumferential surface of the inner gasket layer may comprise a plurality of circumferentially spaced retaining protrusions interfacing between the inner and outer gasket layers; each of the plurality of circumferentially spaced retaining protrusions may have an engagement portion and a separation portion; the engagement portion of the retaining protrusions of a subject outer or inner gasket layer may be connected to the other of the outer gasket layer or the inner gasket layer by a gasket layer connection; and the gasket layer connection may be configured such that the engagement portion of the retaining protrusions will separate from the subject outer or inner gasket layer at the separation portion under a separation force prior to the engagement portion separating from the subject outer or inner gasket layer. The gasket layer connection may comprise an adhesive between a retaining surface of the engagement portion of the retaining protrusions of the subject outer or inner gasket layer and the other of the outer gasket layer or the inner gasket layer. The outer circumferential surface of the inner gasket layer may comprise the retaining protrusions, the inner circumferential surface of the outer gasket layer may comprise a plurality of circumferentially spaced cavities configured to receive the retaining protrusions of the inner gasket layer, and the gasket layer connection may comprise an adhesive between the retaining surface of the engagement portion of the retaining protrusions of the inner gasket layer and an inner cavity surface of the cavities of the outer gasket layer. The gasket layer connection may comprise a mechanical connection between the engagement portion of the retaining protrusions of the subject outer or inner gasket layer and the other of the outer gasket layer or the inner gasket layer. The outer circumferential surface of the inner gasket layer may comprise the retaining protrusions, the inner circumferential surface of the outer gasket layer may comprise a plurality of circumferentially spaced cavities configured to receive the retaining protrusions of the inner gasket layer, and the gasket layer connection may comprise a retaining surface overlap between a retaining surface of the engagement portion of the retaining protrusions of the inner gasket layer and a cavity surface of the cavities of the outer gasket layer that restrains radial movement of the retaining protrusions of the inner gasket layer from the cavities of the outer gasket layer. The retaining surface overlap may comprise an annular shoulder of the cavity surface of the cavities facing an opposed annular flange of the retaining surface of the engagement portion of the retaining protrusions.

BRIEF DESCRIPTION OF THE DRAWINGS

FIG. 3 is a longitudinal vertical cross-sectional view of the assembly shown in FIG. 2, taken generally on line A-A of FIG. 2.

FIG. 22 is a cross-sectional view of an alternative embodiment of the end gasket shown in FIG. 18.

FIG. 23 is an enlarged cross-sectional view of the end gasket shown in FIG. 22, taken generally within the indicated circle K of FIG. 15.

FIG. 24 is cross-sectional view of the end gasket shown in FIG. 22 for installation on the oversized diameter pipe shown in FIG. 20.

FIG. 25 is an enlarged cross-sectional view of the end gasket shown in FIG. 24, taken generally within the indicated circle L of FIG. 25.

FIG. 26 is a cross-sectional view of an alternative embodiment of the end gasket shown in FIG. 22.

FIG. 27 is an enlarged cross-sectional view of the end gasket shown in FIG. 26, taken generally within the indicated circle M of FIG. 26.

FIG. 28 is cross-sectional view of the end gasket shown in FIG. 26 for installation on the oversized diameter pipe shown in FIG. 20.

FIG. 29 is an enlarged cross-sectional view of the end gasket shown in FIG. 28, taken generally within the indicated circle N of FIG. 28.

FIG. 33 is vertical cross-sectional view of the end gasket shown in FIG. 30.

FIG. 34 is an enlarged cross-sectional view of the end gasket shown in FIG. 33, taken generally within the indicated circle O of FIG. 33.

DETAILED DESCRIPTION OF THE EMBODIMENTS

Figure 1:
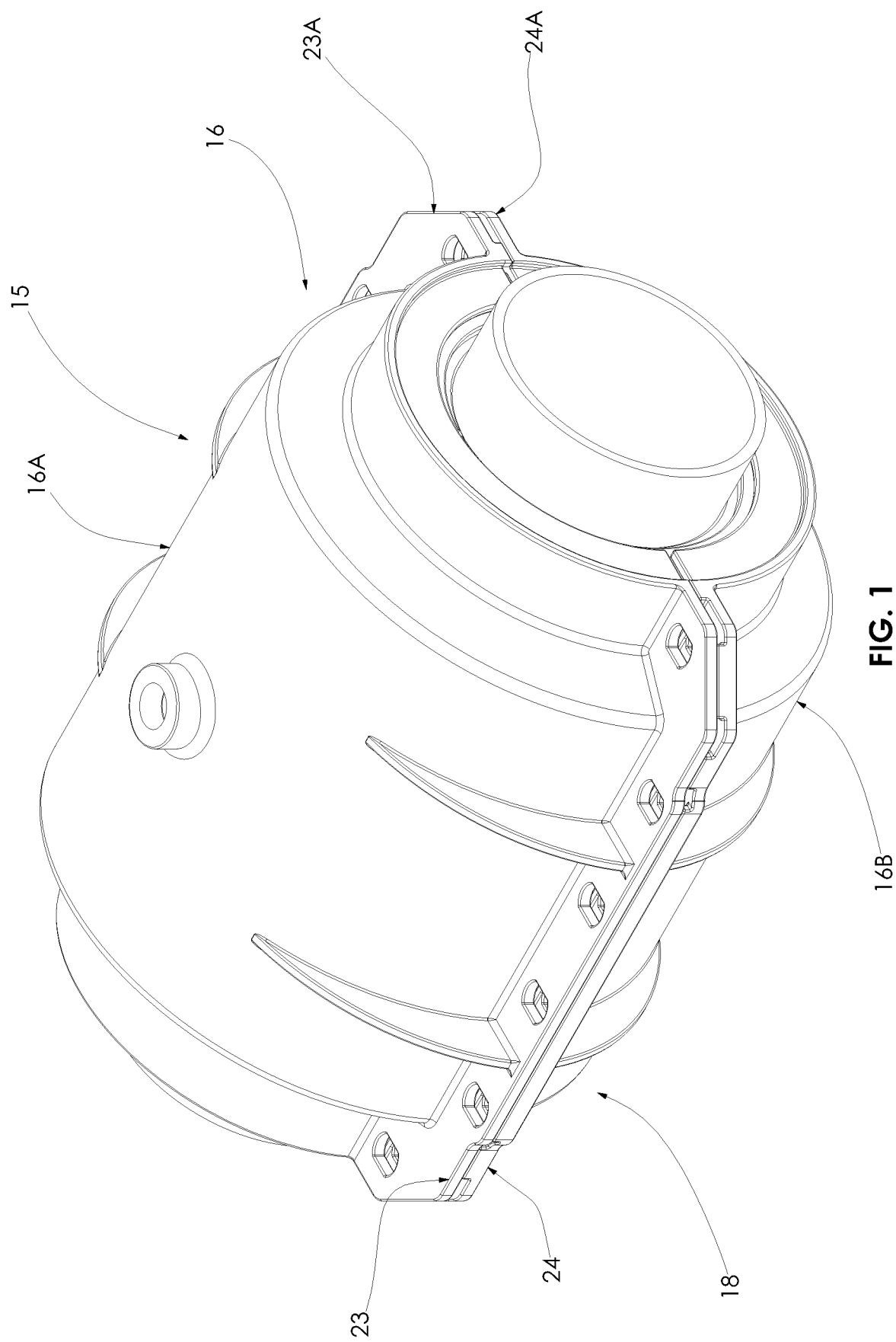
FIG. 1 is a perspective view of an embodiment of the improved assembly.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 2:
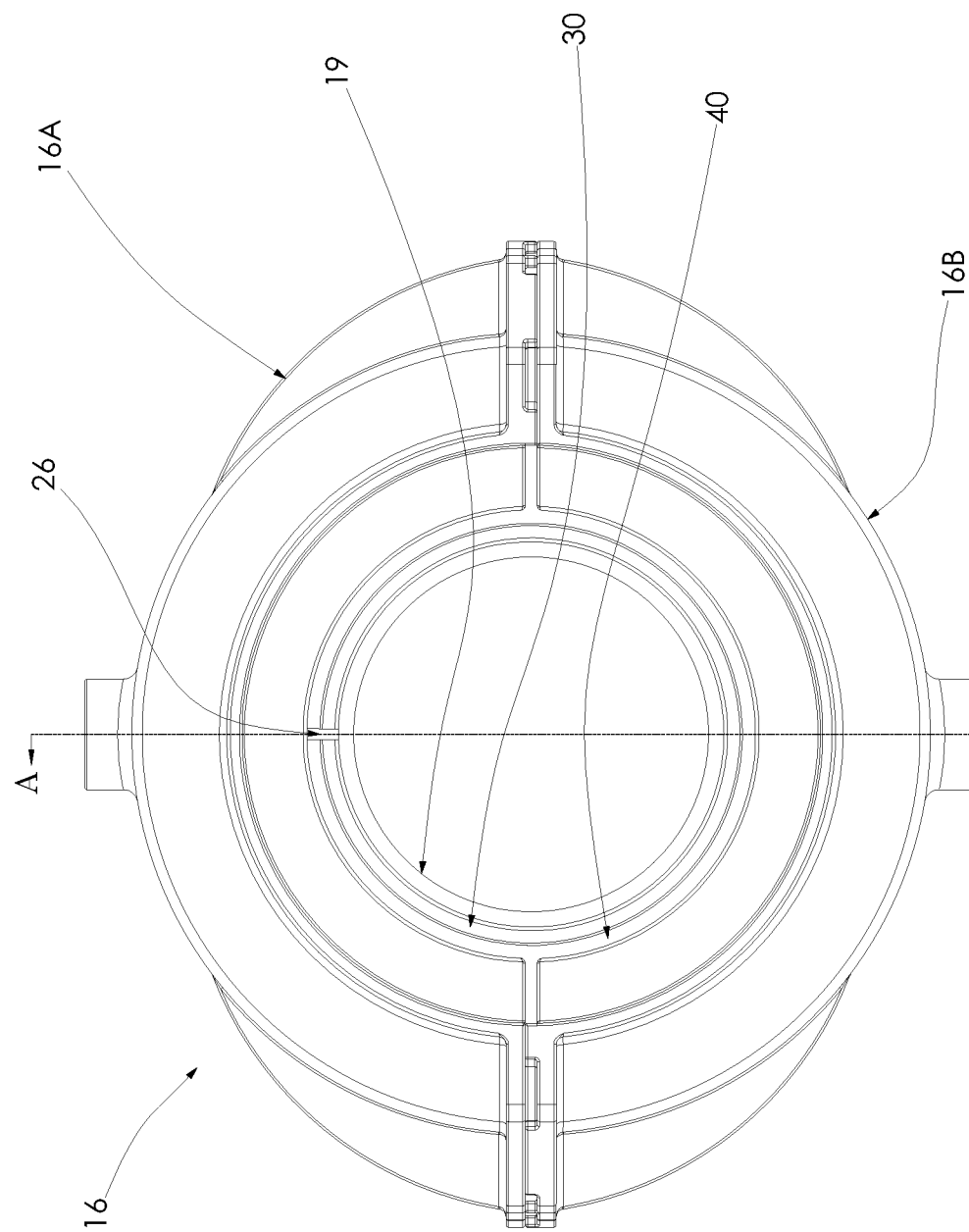
FIG. 2 is an end view of the assembly shown in FIG. 1.

Referring now to the drawings, and more particularly to FIGS. 1-3 thereof, an improved pipe coupling assembly is provided, of which a first embodiment is generally indicated at 15. As shown, assembly 15 generally comprises outer encapsulation sleeve or shell 16 and two end gaskets 25 and 25A, which surround pipe 19 having outer pipe diameter 20. Shell 16, gaskets 25 and 25A and pipe 19 are all generally ring-like cylindrical structures orientated about axis x-x. In operation, sleeve 16 is circumferentially disposed on the outside of pipe 19.

Sleeve 16 includes semi-cylindrical top half shell 16A and semi-cylindrical lower half shell 16B, which are bolted together via tightening assembly 18 to encapsulate pipe 19. Top half shell 16A and bottom half shell 16B are thereby connected and tightened around pipe 19 via bolts, severally indicated at 28A, and nuts, severally indicated at 28B. End gaskets 25 and 25A are configured to wrap around and encircle pipe 19 between outer surface 22 of pipe 19 and specially configured inner pockets 21 and 21A of the two halves 16A and 16B, respectively, of encapsulating sleeve 16 to form a seal, with end gaskets 25A and 25BA sealing on pipe 19 having outer diameter 20. Sleeve 16 is thereby configured and arranged to be tightened around pipe 19 and has two pairs of longitudinally extending opposed flange edges 23, 23A and 24, 24A that are drawn towards each other to seal pipe 16.

End gaskets 25 and 25A have specially contoured features and are disposed generally between the inner surfaces of sleeve 16 and outer cylindrical surface 22 of pipe 16. Thus, end gaskets 25 and 25A are sandwiched between the inside semi-cylindrical surfaces of sleeve 16 and outside cylindrical surface 22 of conduit 19 to provide sufficient sealing force to prevent leakage of fluid. Elastic or sealing energy is imparted into assembly 15 by tightening sleeve 16 from a loosened or a non-actuated position to a tightened sealed position.

As shown in FIGS. 1-7, each of end gaskets 25 and 25A comprises two nested gasket split-ring layers 30, 40 that can be separated from each other. Each end gasket 25 and 25A comprises outer gasket split-ring 40 and removable inner gasket split-ring 30. Inner split-ring or layer 30 may be removed from outer split-ring or layer 40. Cross-section views and enlarged cross-sectional views of the nesting arrangement between outer split-ring 40 and inner split-ring 30 are shown in FIGS. 3-7.

Figure 7:
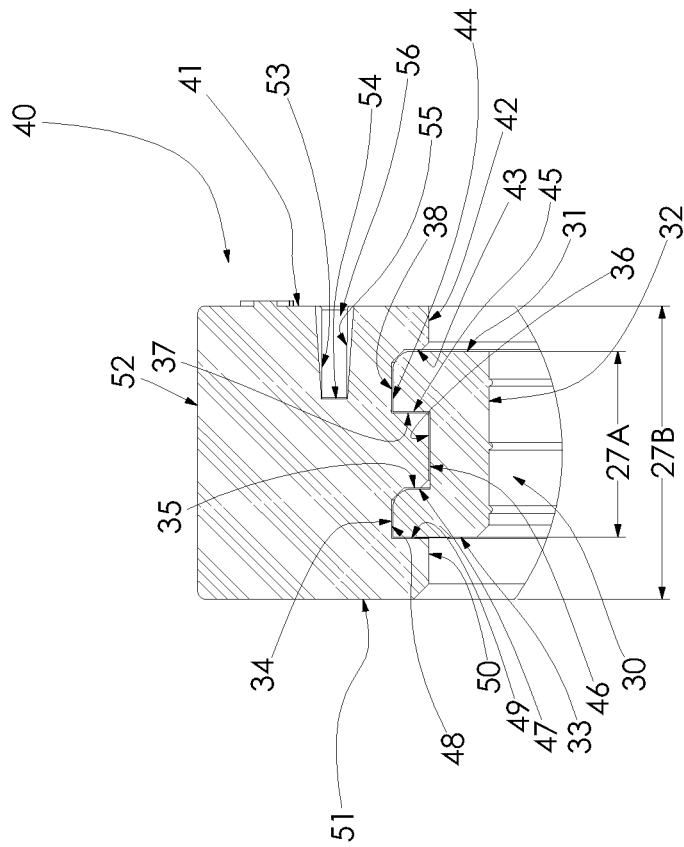
FIG. 7 is an enlarged longitudinal vertical cross-sectional view of the end gasket shown in FIG. 6, taken generally within the indicated circle C of FIG. 6.
Figure 6:
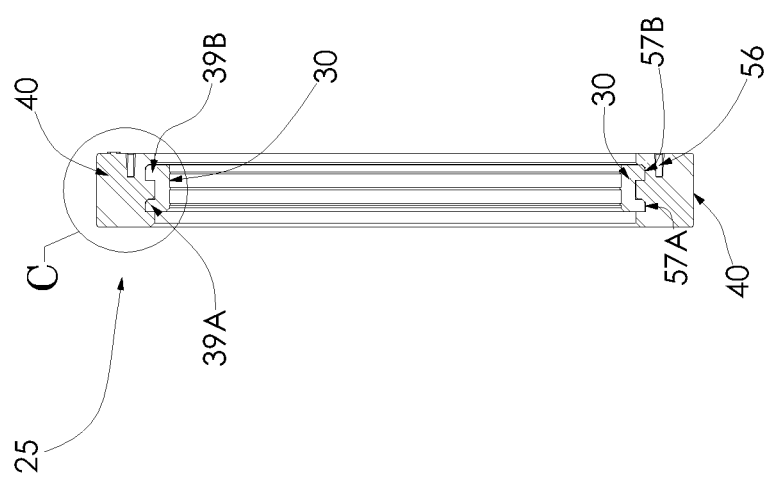
FIG. 6 is an alternative longitudinal vertical cross-sectional view of a nested end gasket.

As shown in FIG. 7, outer split ring gasket 40 is a specially-configured ring-shaped solid penannular member elongated along axis x-x, and is generally bounded by rightwardly-facing vertical annular surface 41, inwardly-facing horizontal cylindrical surface 42, leftwardly-facing vertical annular surface 43, inwardly-facing horizontal cylindrical surface 44, rightwardly-facing vertical annular surface 45, inwardly-facing horizontal cylindrical surface 46, leftwardly-facing vertical annular surface 47, inwardly-facing horizontal cylindrical surface 48, rightwardly-facing vertical annular surface 49, inwardly-facing horizontal cylindrical surface 50, leftwardly-facing vertical annular surface 51, and outwardly-facing horizontal cylindrical surface 52, joined at its right marginal end to the outer marginal end of surface 41.

As shown, surface 41 includes annular pressure assist cavity 56 defined by inwardly-facing horizontal cylindrical surface 53, rightwardly-facing concave curved annular surface 54, and outwardly-facing horizontal cylindrical surface 55, with surface 55 joined at its right marginal end to the surface 41 and surface 53 joined at its right marginal end to surface 41. Surfaces 47, 48 and 49 define first annular channel 57A in the inner circumference surfaces 42 and 50 of outer gasket 40, and surfaces 43, 44 and 45 define second annular channel 57B in the inner circumference surfaces 42 and 50 of outer gasket 40.

As shown in FIG. 7, inner split ring gasket 30 is a specially-configured ring-shaped solid penannular member elongated along axis x-x, and is generally bounded by rightwardly-facing vertical annular surface 31, inwardly-facing horizontal cylindrical surface 32, leftwardly-facing vertical annular surface 33, outwardly-facing horizontal cylindrical surface 34, rightwardly-facing vertical annular surface 35, outwardly-facing horizontal cylindrical surface 36, leftwardly-facing vertical annular surface 37, and outwardly-facing horizontal cylindrical surface 38, joined at its right marginal end to the outer marginal end of surface 31. The outer portion of surface 49 and surfaces 34 and 35 define spline 39A extending outwardly from outer circumferential surface 36 of inner gasket 30, and surfaces 36 and 37 and the outer portion of surface 38 define spline 39B extending outwardly from outer circumferential surface 36 of inner gasket 30. Splines 39A and 39B of inner gasket 30 are orientated in a plane substantially perpendicular to axis x-x and mate with channels 57A and 57B of outer gasket 40, respectively. As shown, inner gasket layer 30 has axial width 27A between side surfaces 31 and 33 that is less than axial width 27B between side surfaces 41 and 51 of outer gasket layer 40.

Figure 8:
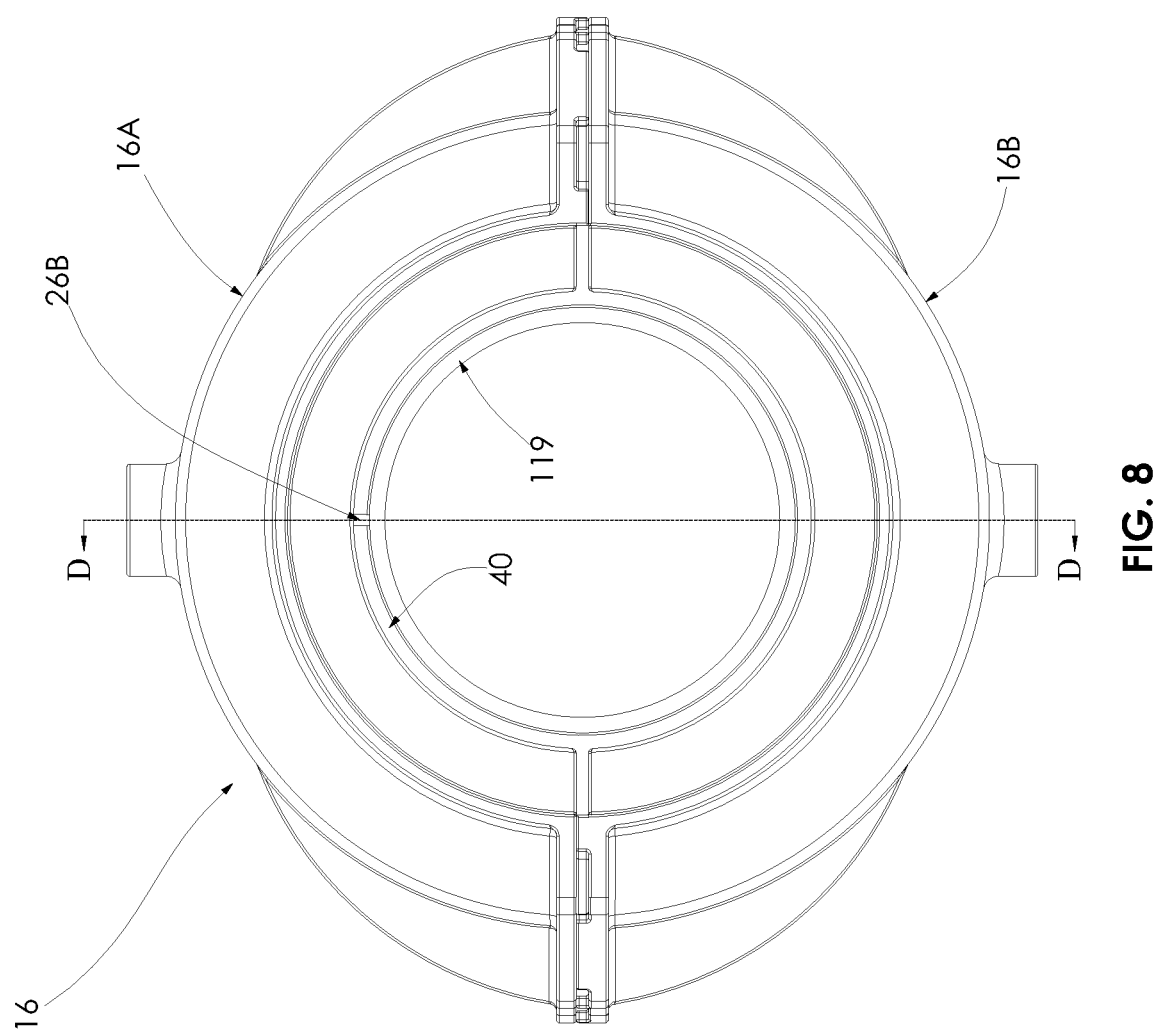
FIG. 8 is an end view of the assembly shown in FIG. 1 installed on an oversized diameter pipe.
Figure 9:
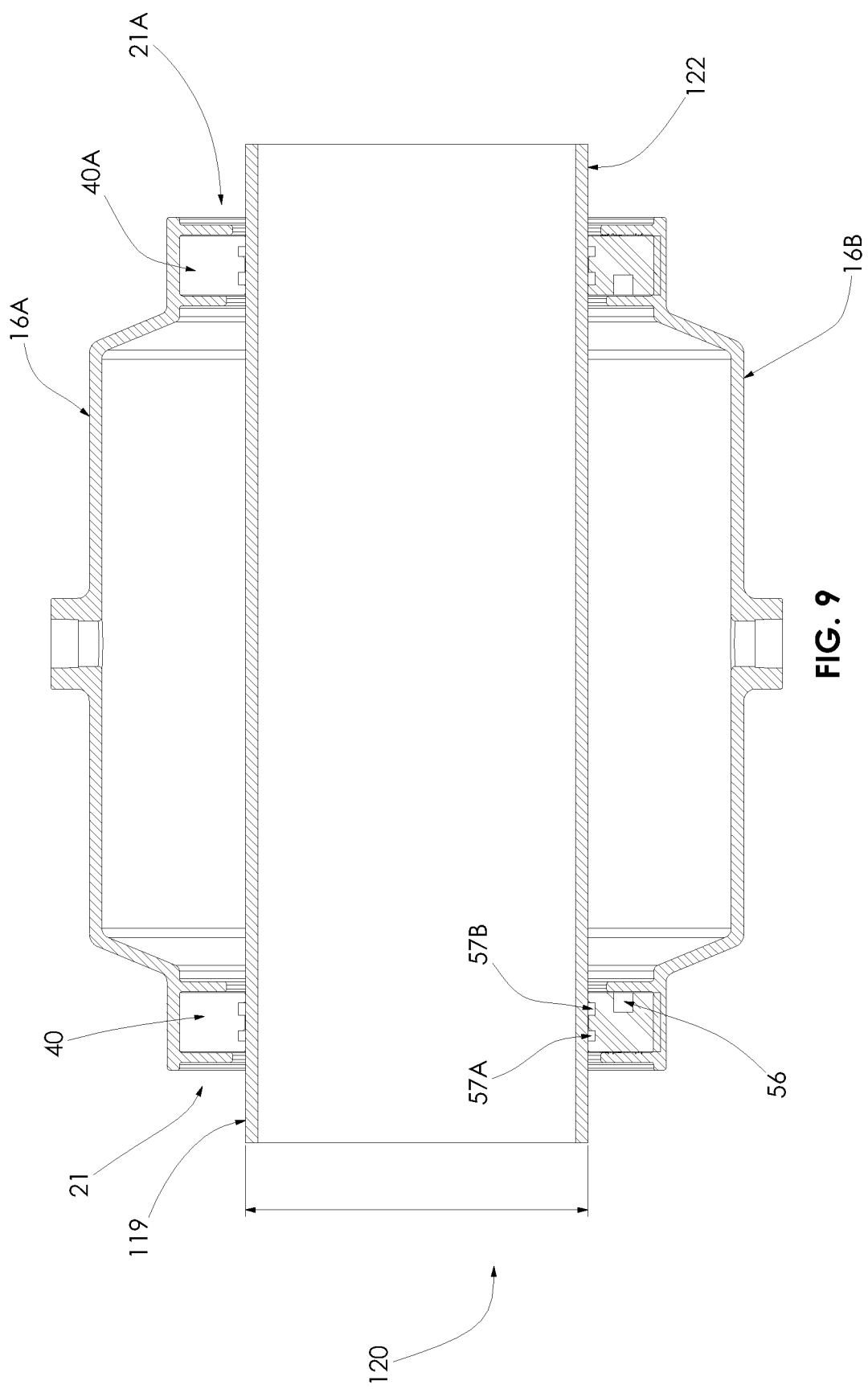
FIG. 9 is a longitudinal vertical cross-sectional view of the assembly shown in FIG. 8, taken generally on line D-D of FIG. 8.
Figure 10:
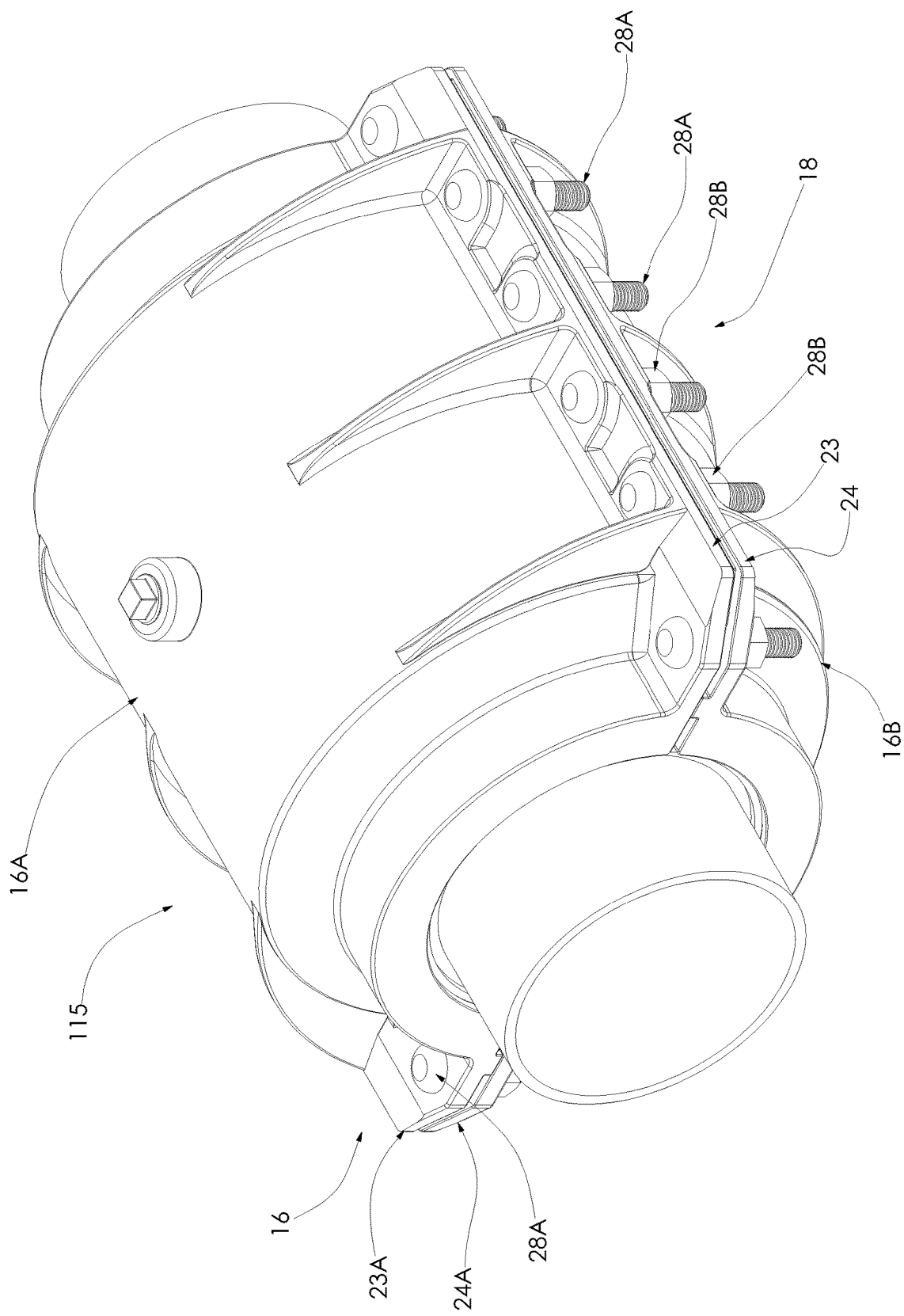
FIG. 10 is a perspective view of a second embodiment of the improved assembly.
Figure 11:
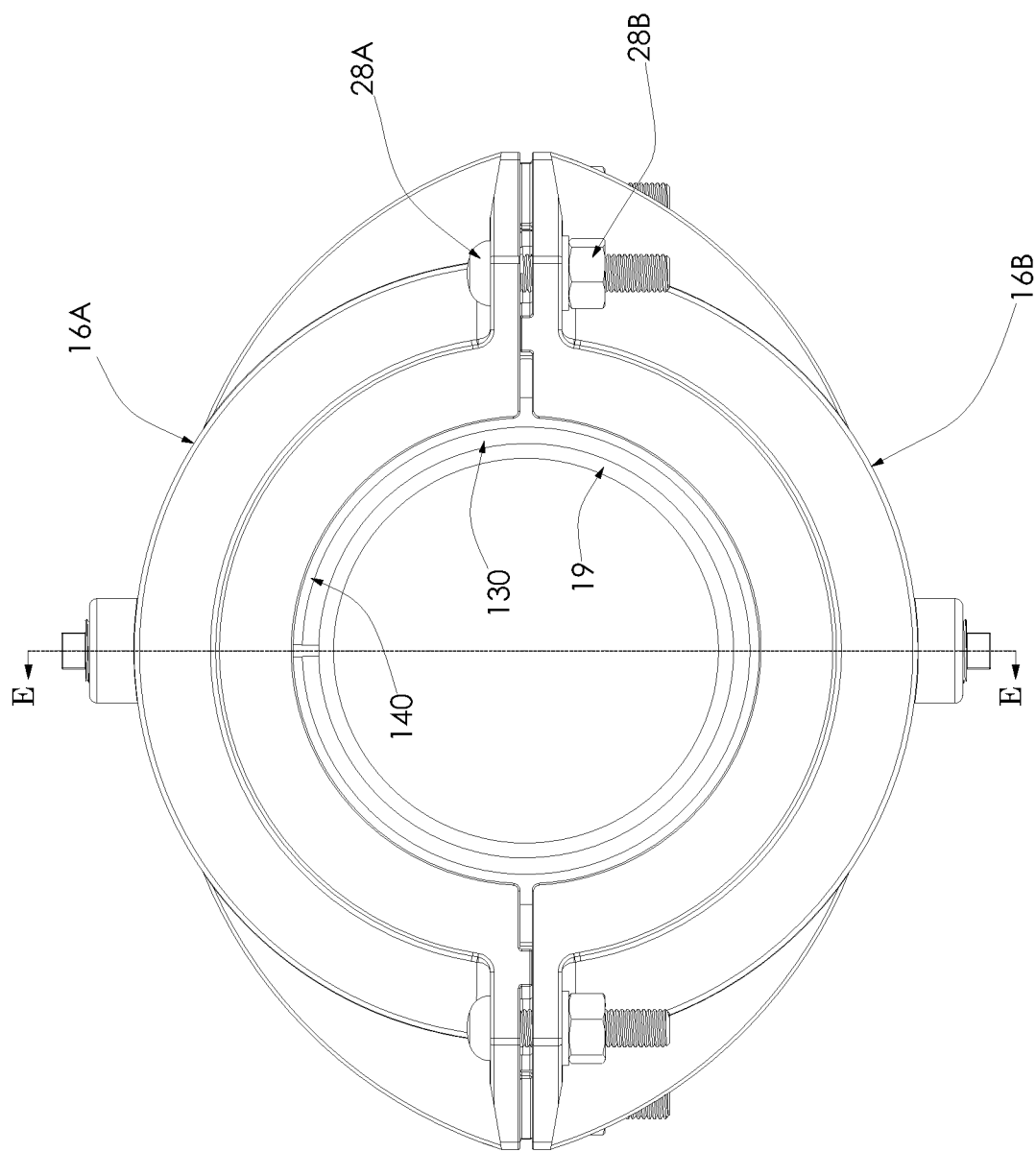
FIG. 11 is an end view of the assembly shown in FIG. 10.

As shown, inner split-ring 30 does not entirely overlap outer split-ring 40. Inner split-ring 30 has outer axial width 27A along axis x-x and outer split ring 40 has outer axial width 27B along axis x-x greater than axial width 27A of inner split ring 30. Right and left edges 31 and 33 of inner split-ring 30 are significantly inward of right and left edges 41 and 51, respectively, of outer split-ring 40. Inner gasket split-ring 30 is manually removable from outer gasket split-ring 40 to allow end gaskets 25 and 25A to be installed on oversize pipe 119 having outer diameter 120, as shown in FIGS. 8 and 9.

Split-ring end gaskets 25 and 25A are formed of a resilient material and are cut radially so as to be penannular and not form a full ring. Thus, instead of being a full continuous annular ring, radial break or gap 26 is provided through each layer 30 and 40 at a circumferential location. Thus, each layer 30 and 40 has a radial split 26A and 26B, respectively, through the entire gasket cross-section. The edges of gap 26 may thereby be manually separated or pulled apart from each other to form a more open C-shaped member. This gap is increased such that it is greater than outer diameter 20 of pipe 19 such that end gasket 25 and 25A can be installed on or fit around outer diameter 20 of pipe 19. Once installed on pipe 19, the opposed ends of the split-rings 30 and 40 will move back towards each other and gap 26 will close up.

Inner split-ring 30 and outer split-ring 40 are loosely connected to each other via annular splines 39A and 39B of inner gasket 30 being nested in annular channels 57A and 57B, respectively, such that inner split-ring 30 is adapted to be removed from outer split-ring 40 at a predetermined location. This allows end gasket 25 to be used with pipes of substantially different diameters. Thus, for pipe 19 having smaller outer diameter 20, inner and outer split-rings 30 and 40 are nested and used together, as shown in FIGS. 1-5. For pipes 119 of greater outer diameter 120, inner split-ring 30 is manually separated from outer split-ring 40 and just outer split-ring 40 is used as the end gasket, as shown in FIGS. 8 and 9.

Figure 5:
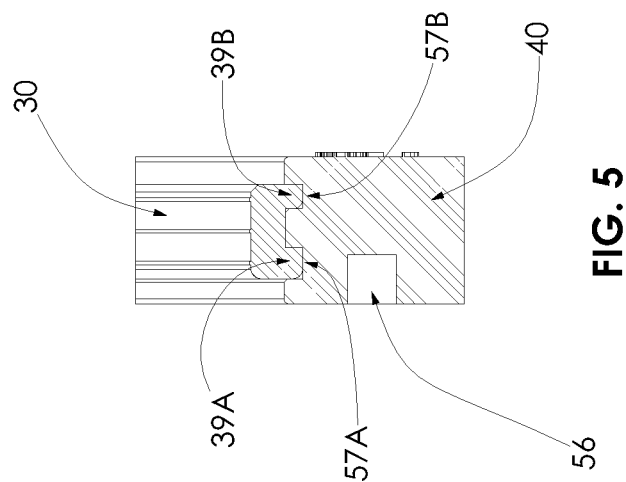
FIG. 5 is an enlarged longitudinal vertical cross-sectional view of the end gasket shown in FIG. 4, taken generally on line B-B of FIG. 4.
Figure 4:
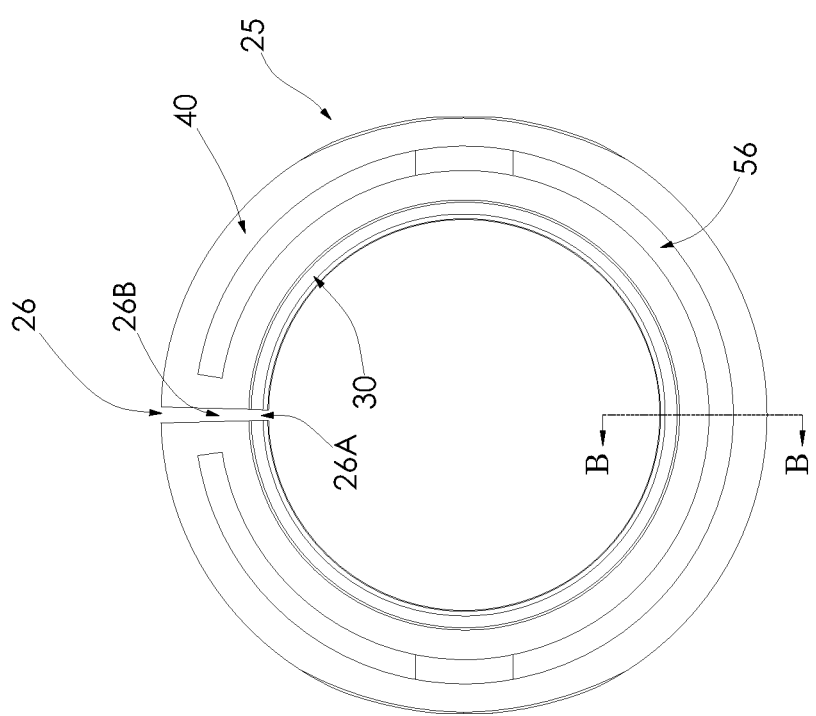
FIG. 4 is an enlarged end view of one of the two end gaskets shown in FIG. 3.

As shown in FIGS. 5 and 7, outer split-ring gasket layer 40 includes pressure assist cavity 56 to aid in sealing to pipe 19 or 119 under compressive pressure.

Turning now to FIGS. 10-21, a pipe coupling assembly 115 according to a second example embodiment is shown. Coupling assembly 115 has a number of the features of assembly 15 described above in connection with FIGS. 1-9. The significant difference between coupling assembly 115 and assembly 15 are the features of assembly 115 that limit rotational movement of gasket layers 130 and 140 relative to each other about axis x-x.

Referring now FIGS. 10-21, assembly 115 generally comprises outer encapsulation sleeve or shell 16 and end gaskets 125 and 125A, which surround pipe 19 having outer diameter 20. As with assembly 15, shell 16, gaskets 125 and 125A and pipe 19 are all generally ring-like cylindrical structures orientated about axis x-x.

Sleeve 16 of assembly 115 is substantially the same as sleeve 16 of assembly 15, having a semi-cylindrical top half shell 16A and semi-cylindrical lower half shell 16B, which are bolted together via bolts 28A and nuts 28B. End gaskets 125 and 125A are configured to wrap around and encircle pipe 19 between outer surface 22 of pipe 19 and specially configured inner pockets 21 and 21A of the two halves 16A and 16B, respectively, of encapsulating sleeve 16 to form a seal, with end gaskets 125A and 125B sealing on pipe 19 having outer diameter 20. Each of pockets 21 and 21A of the two halves 16A and 16B are semi-cylindrical inner open-faced channels configured to axially-retain outer gasket 140.

End gaskets 125 and 125A have specially contoured features and are disposed generally between the inner surfaces of sleeve 16 and outer cylindrical surface 22 of pipe 16. Thus, end gaskets 125 and 125A are sandwiched between the inside semi-cylindrical surfaces of sleeve 16 and outside cylindrical surface 22 of conduit 19 to provide sufficient sealing force to prevent leakage of fluid. Elastic or sealing energy is imparted into assembly 115 by tightening sleeve 16 from a loosened or a non-actuated position to a tightened sealed position.

As shown, each of end gaskets 125 and 125A comprises two nested gasket split-ring layers 130, 140 that can be separated from each other. Each end gasket 125 and 125A comprises outer gasket split-ring 140 and removable inner gasket split-ring 130. Inner split-ring or layer 130 may be removed from outer split-ring or layer 140.

Figure 16:
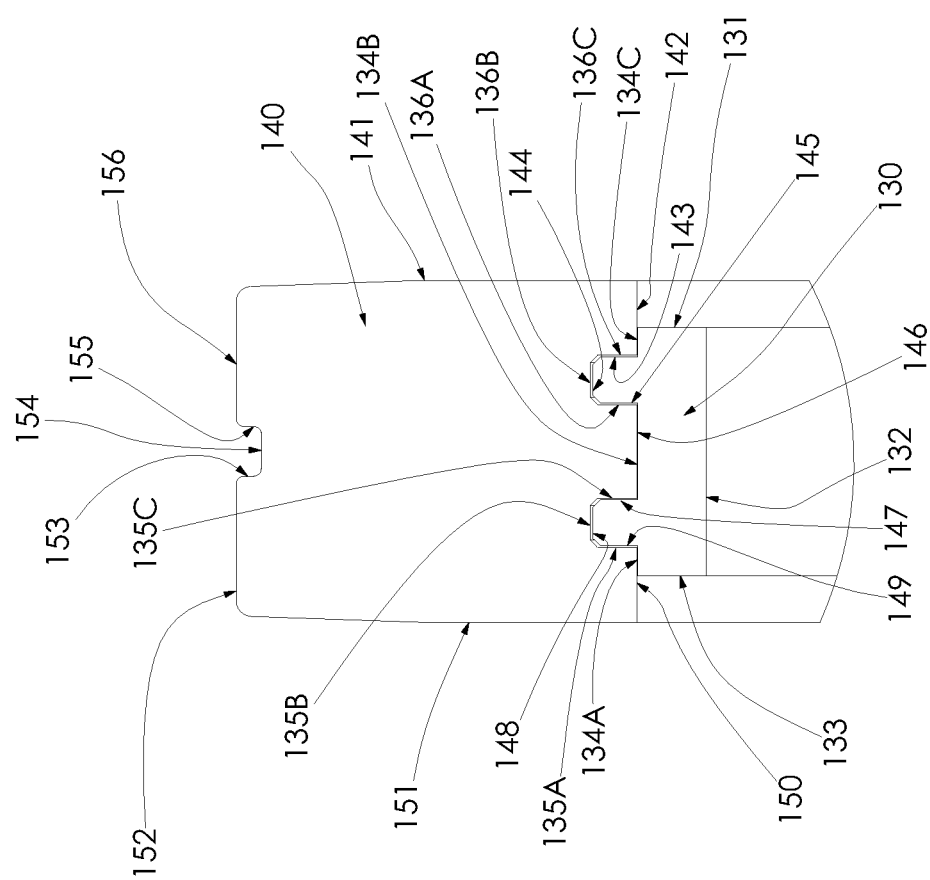
FIG. 16 is an enlarged longitudinal vertical cross-sectional view of the end gasket shown in FIG. 15, taken generally within the indicated circle H of FIG. 15.
Figure 18:
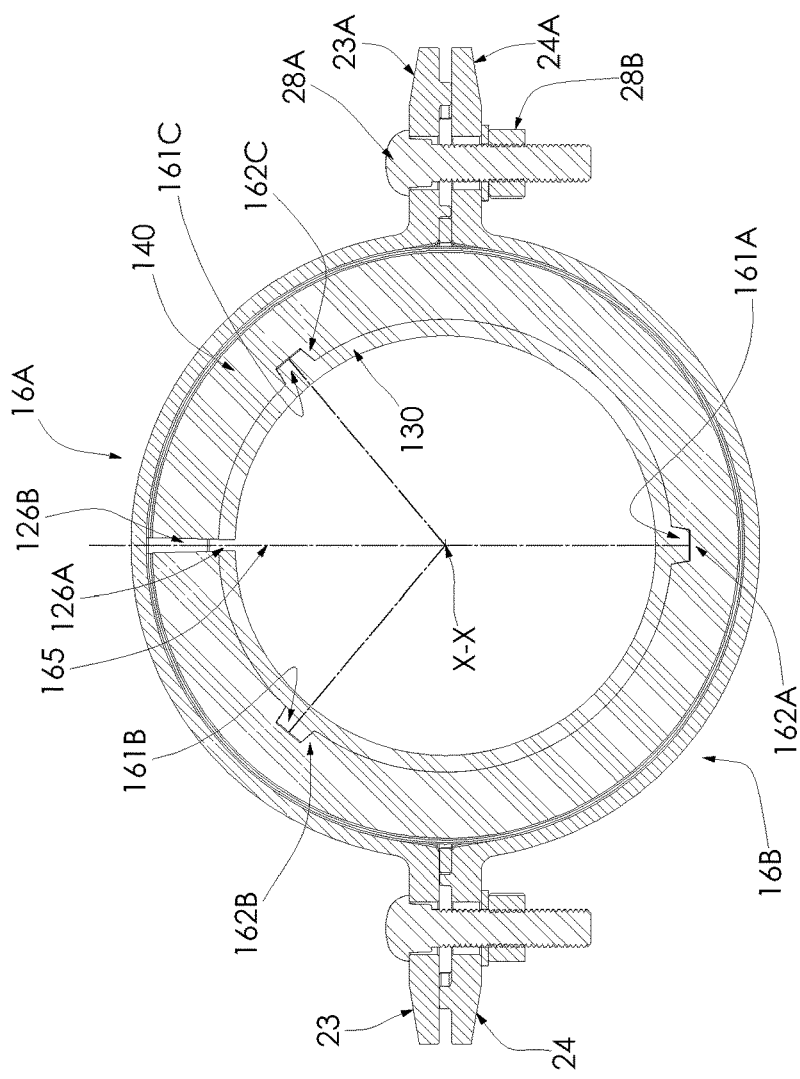
FIG. 18 is an enlarged transverse vertical cross-sectional view of assembly shown in FIG. 17, taken generally on line I-I of FIG. 17.
Figure 17:
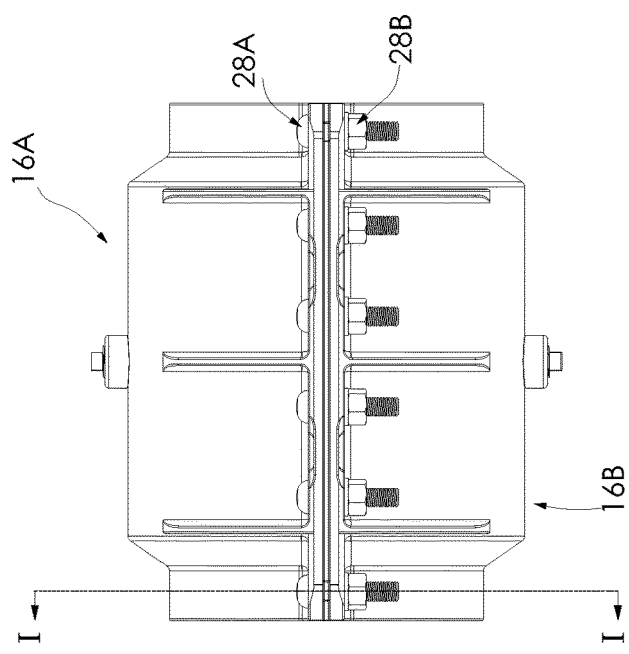
FIG. 17 is a side view of the assembly shown in FIG. 10.
Figure 19:
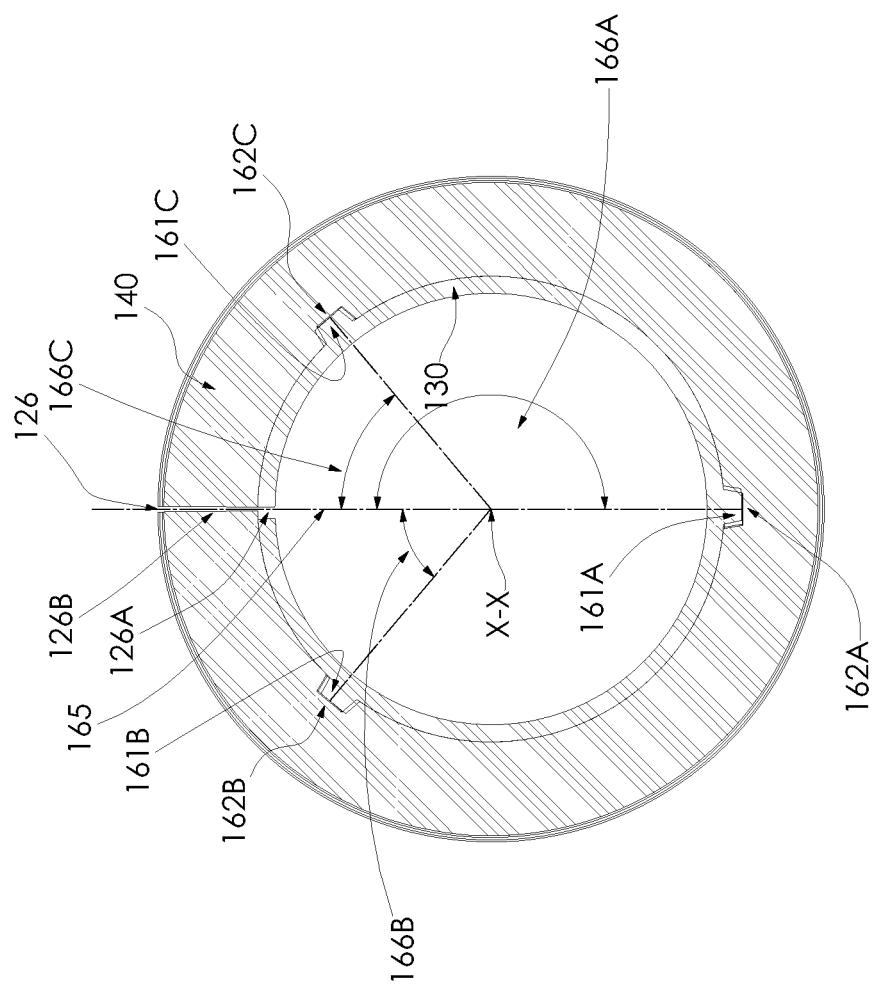
FIG. 19 is a cross-sectional view of the end gasket shown in FIG. 18.

As shown in FIG. 16, outer split ring gasket 140 is a specially-configured ring-shaped solid penannular member elongated along axis x-x, and is generally bounded by rightwardly-facing vertical annular surface 141, inwardly-facing horizontal cylindrical surface 142, leftwardly-facing vertical annular surface 143, inwardly-facing horizontal cylindrical surface 144, rightwardly-facing vertical annular surface 145, inwardly-facing horizontal cylindrical surface 146, leftwardly-facing vertical annular surface 147, inwardly-facing horizontal cylindrical surface 148, rightwardly-facing vertical annular surface 149, inwardly-facing horizontal cylindrical surface 150, leftwardly-facing vertical annular surface 151, outwardly-facing horizontal cylindrical surface 152, rightwardly-facing vertical annular surface 153, outwardly-facing horizontal cylindrical surface 154, leftwardly-facing vertical annular surface 155, and outwardly-facing horizontal cylindrical surface 156, joined at its right marginal end to the outer marginal end of surface 141. Surfaces 147, 148 and 149 define first annular channel 157A in the inner circumference surfaces 142 and 150 of outer gasket 140, and surfaces 143, 144 and 145 define second annular channel 157B in the inner circumference surfaces 142 and 150 of outer gasket 140.

As shown, outer circumferential surface 152, 155 includes annular groove 160 defined by rightwardly-facing vertical annular surface 153, outwardly-facing horizontal cylindrical surface 154 and leftwardly-facing vertical annular surface 155. As shown, groove 160 extends into the outer circumferential surface of outer gasket 140 in a plane substantially perpendicular to axis x-x. Groove 160 provides volumetric space for gasket 140 to move into as sleeve 16 is tightened to pipe 19 and gasket 125 is radially compressed between shell 16 and pipe 19, facilitating an improved seal.

Figure 20:
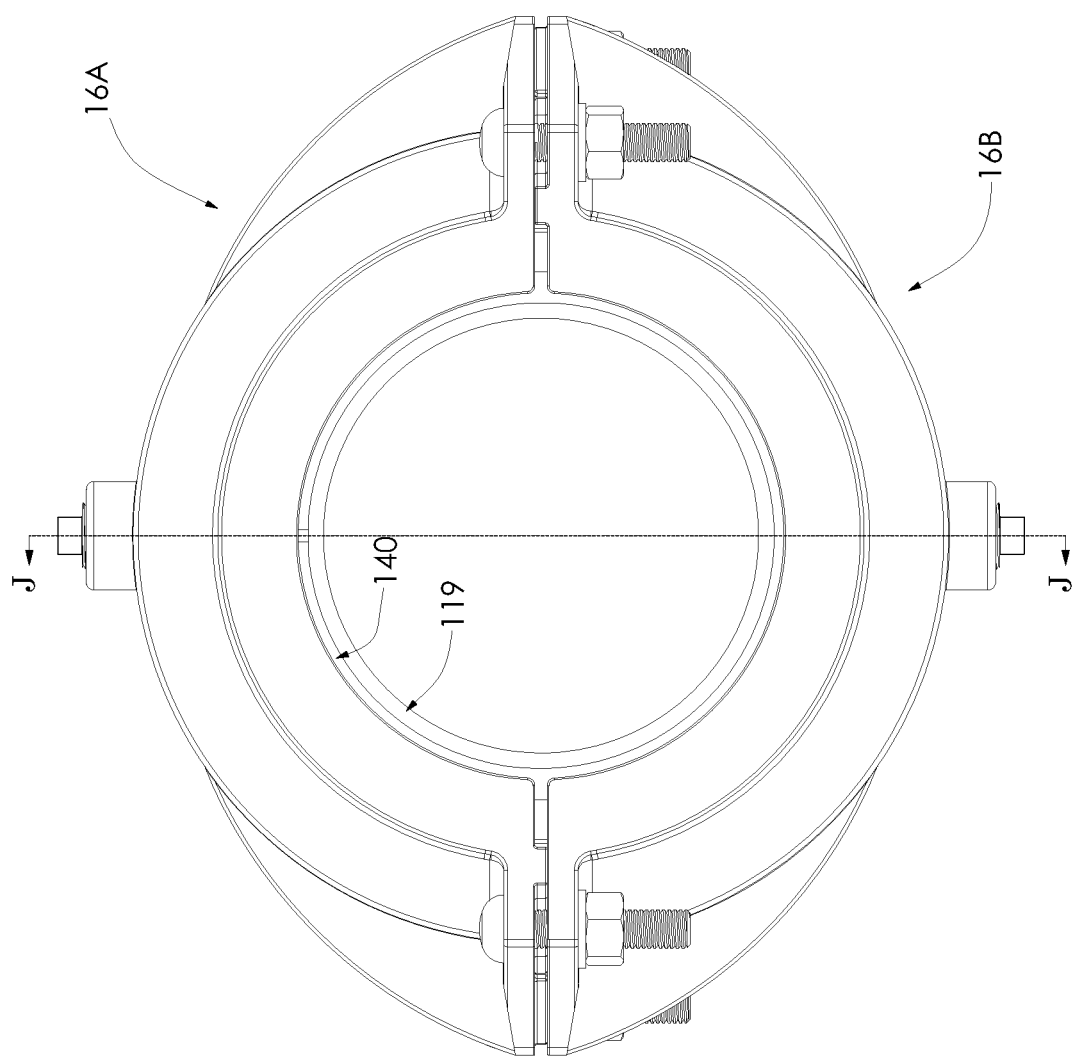
FIG. 20 is an end view of the assembly shown in FIG. 10 installed on an oversized diameter pipe.
Figure 21:
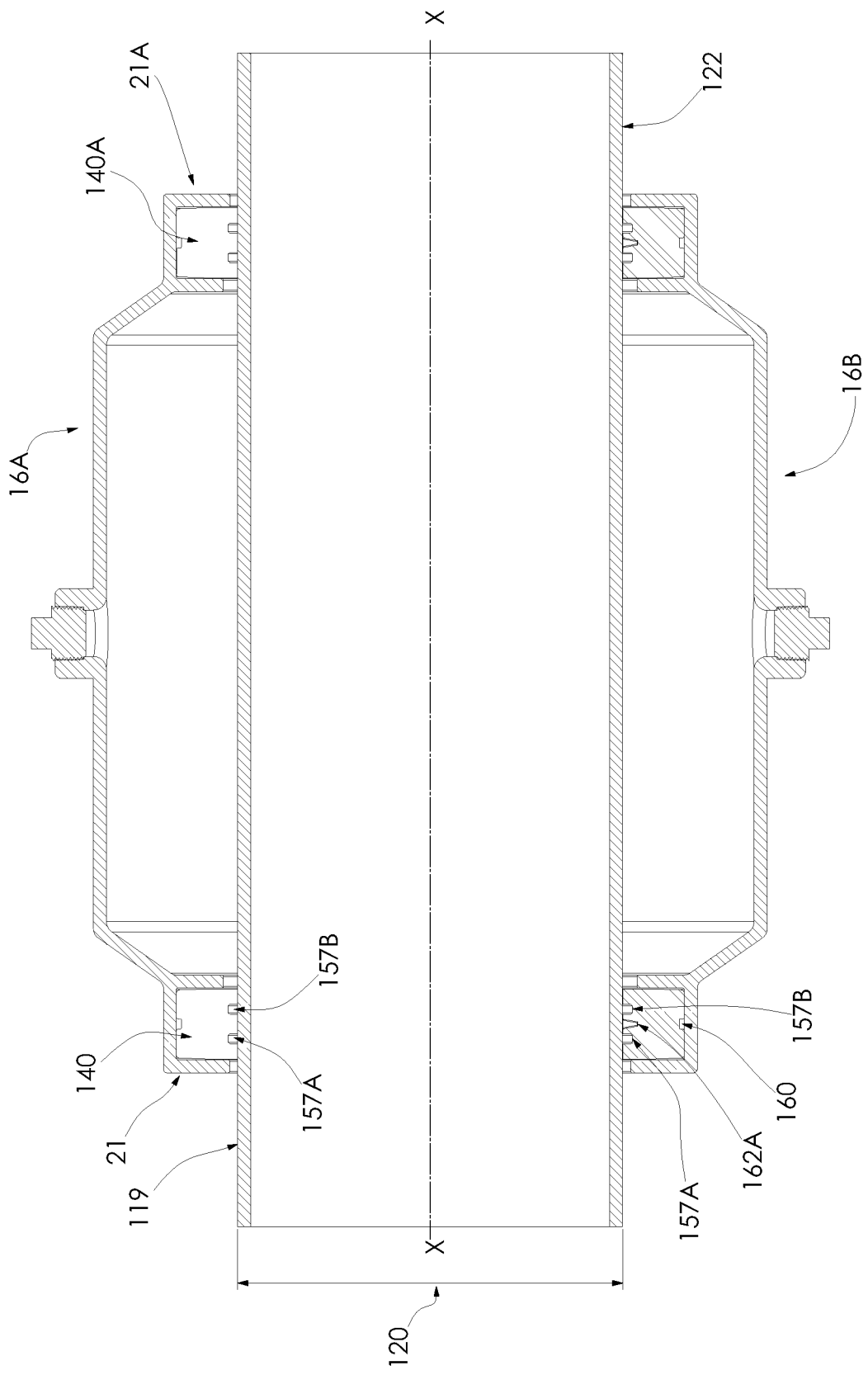
FIG. 21 is a longitudinal vertical cross-sectional view of the assembly shown in FIG. 20, taken generally on line J-J of FIG. 20.
Figure 30:
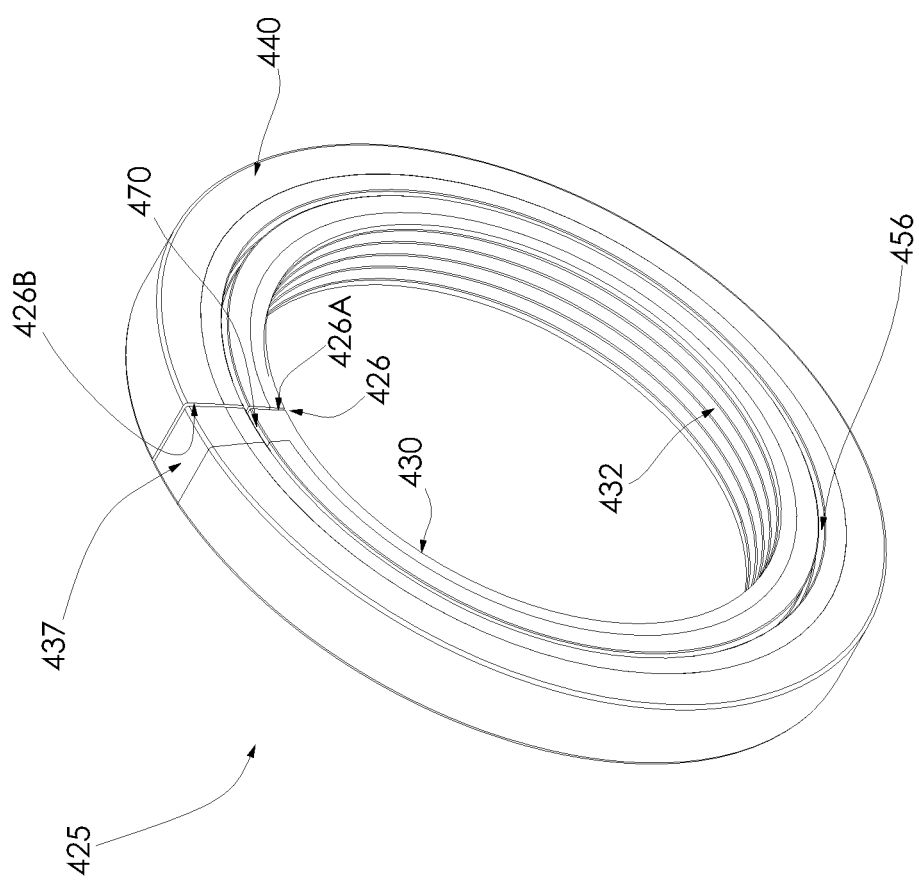
FIG. 30 is a perspective view of an alternative embodiment of the end gasket shown in FIG. 26.

As shown in FIG. 16, inner split ring gasket 130 is a specially-configured ring-shaped solid penannular member elongated along axis x-x, and is generally bounded by rightwardly-facing vertical annular surface 131, inwardly-facing horizontal cylindrical surface 132, leftwardly-facing vertical annular surface 133, outwardly-facing horizontal cylindrical surface 134A, leftwardly-facing vertical annular surface 135A, outwardly-facing horizontal cylindrical surface 135B, rightwardly-facing vertical annular surface 135C, outwardly-facing horizontal cylindrical surface 134B, leftwardly-facing vertical annular surface 136A, outwardly-facing horizontal cylindrical surface 136B, rightwardly-facing vertical annular surface 136C, and outwardly-facing horizontal cylindrical surface 134C, joined at its right marginal end to the outer marginal end of surface 131. Surfaces 135A, 135B and 135C define spline 139A extending outwardly from outer circumferential surface 134A, 134B and 134C of inner gasket 130, and surfaces 136A, 136B and 136C define spline 139B extending outwardly from outer circumferential surface 134A, 134B and 1345C of inner gasket 130. Splines 139A and 139B of inner gasket 130 are orientated in a plane substantially perpendicular to axis x-x and mate with channels 157A and 157B of outer gasket 140, respectively. As shown, inner gasket layer 130 has axial width 127A between side surfaces 131 and 133 that is less than axial width 127B between side surfaces 141 and 151 of outer gasket layer 140. Inner gasket split-ring 130 is manually removable from outer gasket split-ring 140 to allow end gaskets 125 and 125A to be installed on oversize pipe 119 having outer diameter 120, as shown in FIGS. 20 and 21.

Split-ring end gaskets 125 and 125A are formed of a resilient material and are cut radially so as to be penannular and not form a full ring. Thus, instead of being a full continuous annular ring, radial break or gap 126 is provided through each layer 130 and 140 at a circumferential location. Thus, each layer 130 and 140 has radial split 126A and 126B, respectively, through the entire gasket cross-section. The edges of gap 126 may thereby be manually separated or pulled apart from each other to form a more open C-shaped member. This gap is increased such that it is greater than outer diameter 20 of pipe 19 so that end gaskets 125 and 125A can be installed on or fit around outer diameter 20 of pipe 19. Once installed on pipe 19, the opposed ends of the split-rings 130 and 140 will move back towards each other and gap 126 will close up.

Inner split-ring 130 and outer split-ring 140 are loosely connected to each other via annular splines 139A and 139B of inner gasket 130 being nested in annular channels 157A and 157B, respectively, such that inner split-ring 130 is adapted to be removed from outer split-ring 140 at a predetermined location. This allows end gasket 125 to be used with pipes of substantially different diameters. Thus, for pipe 19 having smaller outer diameter 20, inner and outer split-rings 130 and 140 are nested and used together, as shown in FIGS. 10-16. For pipes 119 of greater outer diameter 120, inner split-ring 130 is manually separated from outer split-ring 140 and just outer split-ring 140 is used as the end gasket, as shown in FIGS. 20 and 21. Accordingly, gaskets 125 and 125A each include penannular outer gasket layer 140 and separate penannular inner gasket layer 130 that is insertable into and removable from outer gasket layer 140. Gaskets 125 and 125A define a gasket opening orientated about longitudinal axis x-x.

As shown in FIGS. 14, 15, 18 and 19, inner gasket layer 130 includes three circumferentially spaced radially extending protrusions 161A, 161B and 161C interfacing with correspondingly circumferentially spaced radially inwardly extending cavities 162A, 162B and 162C in outer gasket layer 140. Protrusions 161A, 161B and 161C of gasket layer 130 mate with cavities 162A, 162B and 162C in outer gasket layer 140 to retain gasket layers 130 and 140 in rotational and angular alignment about longitudinal axis x-x. When nested, protrusions 161A, 161B and 161C of gasket layer 130, mated with cavities 162A, 162B and 162C of gasket layer 140, prevent rotational movement of gasket layers 130 and 140 relative to each other about axis x-x such that radial splits 126A and 126B are aligned on common radius 165 about axis x-x.

Figure 12:
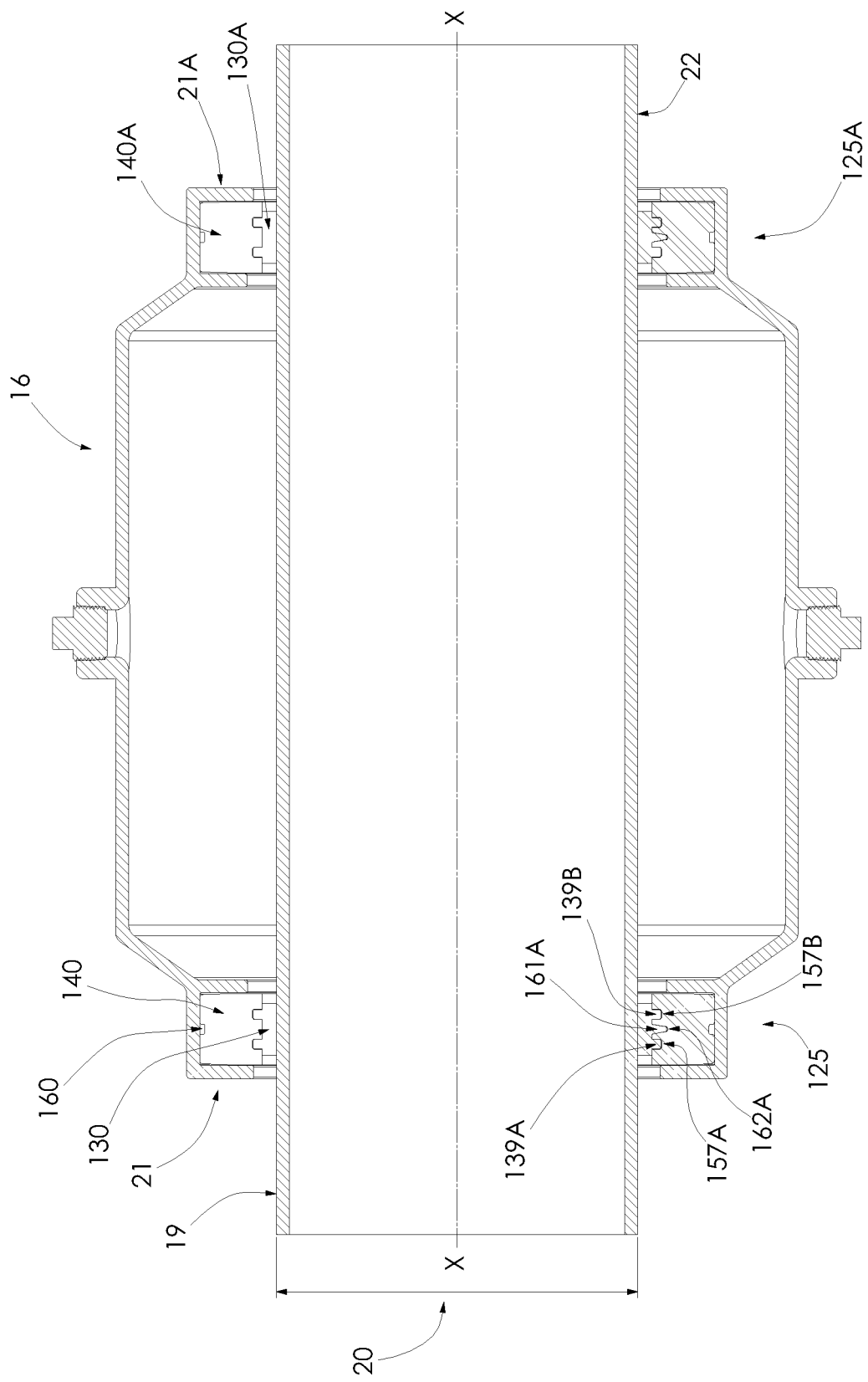
FIG. 12 is a longitudinal vertical cross-sectional view of the assembly shown in FIG. 11, taken generally on line E-E of FIG. 11.
Figure 15:
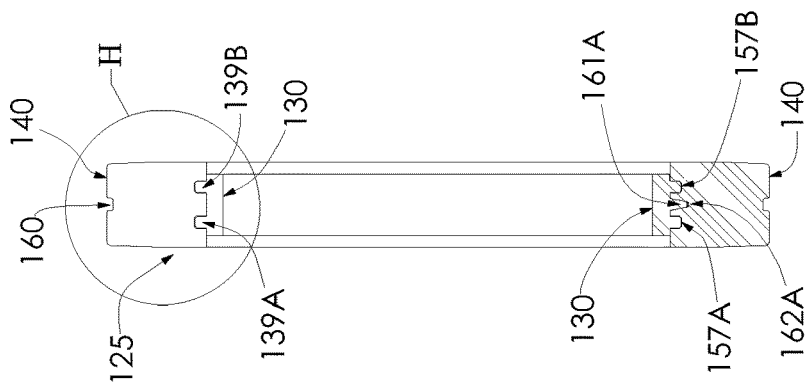
FIG. 15 is a longitudinal vertical cross-sectional view of the end gasket shown in FIG. 13, taken generally on line G-G of FIG. 13.
Figure 14:
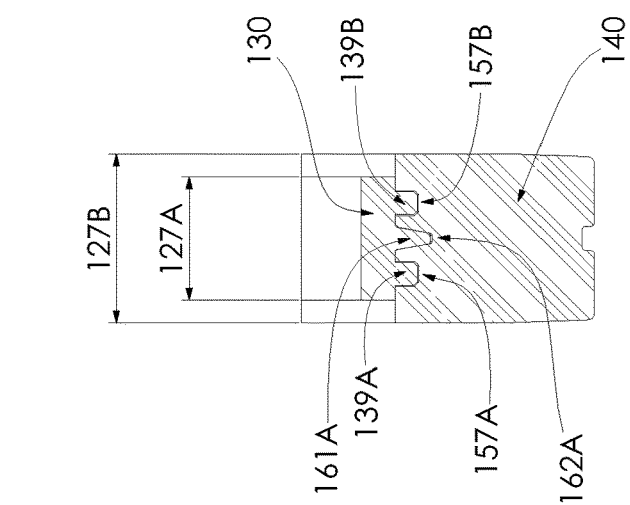
FIG. 14 is an enlarged longitudinal vertical cross-sectional view of the end gasket shown in FIG. 13, taken generally on line F-F of FIG. 13.
Figure 13:
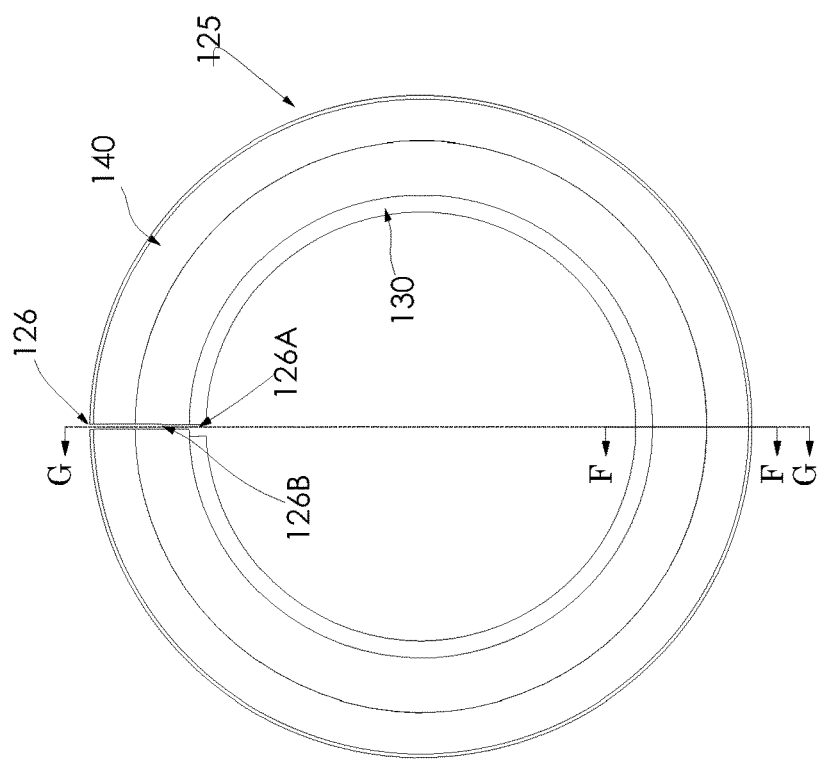
FIG. 13 is an enlarged end view of one of the two end gaskets shown in FIG. 12.

Outer gasket layer 140 is configured to nest in annular pocket 21 of shell 16 along outer circumferential surfaces 152, 156 and has inner circumferential surfaces 142, 146 and 150 configured to engage either inner gasket layer 130, as shown in FIG. 12, or outer surface 122 of pipe 119 when inner gasket layer 130 is removed, as shown in FIG. 21. Inner gasket layer 130 is configured to nest in annular channels 157A and 157B and circumferentially spaced cavities 162A, 162B and 162C of outer gasket 140 via splines 139A and 139B and circumferentially spaced spokes 161A, 161B and 161C, respectively, and has inner circumferential surface 132 configured to engage outer surface 22 of pipe 19. Accordingly, inner gasket layer 130 may be readily removed from and reinserted into outer gasket layer 140. By positioning inner gasket layer 130 within outer gasket layer 140 with splines 139A and 139B and circumferentially spaced spokes 161A, 161B and 161C of inner gasket layer 130 aligned with annular channels 157A and 157B and circumferentially spaced cavities 162A, 162B and 162C of outer gasket 140, respectively, outer and inner gasket layers 130 and 140 are both held together by their own resiliency, although gasket layers 130 and 140 may be easily separated by pulling inner gasket layer 130 inwardly in a radial direction and then away from outer gasket layer 140, and rotationally or angularly aligned about axis x-x relative to each other via circumferentially spaced spokes 161A, 161B and 161C and cavities 162A, 162B and 162C.

As shown, outer gasket layer 140 includes outer circumferential surfaces 152 and 156 facing shell pocket 21 and inner circumferential surfaces 142, 146 and 150 facing inner gasket layer 130, or pipe 119 when inner gasket layer 130 is removed. The inner circumferential surfaces 142, 146 and 150 define a first opening having a first diameter 120, as shown in FIG. 21. Similarly, inner gasket layer 130 includes outer circumferential surfaces 134A, 134B and 134C facing outer gasket layer 140 and inner circumferential surface 132 facing pipe 19. Inner circumferential surface 132 defines a second opening having a second smaller diameter 20, as shown in FIG. 12.

Inner gasket layer 130 may be selectively disengaged from outer gasket layer 140 and removed from coupling assembly 115 to modify an effective range of pipe outer diameters that may be sealed by and accommodated within coupling assembly 115. Thus, removable inner gasket layer 130 enables modification of an effective diameter of coupling assembly 115. For example and without limitation, diameter 20 may allow coupling assembly 15 to receive a pipe or pipe end having an outer diameter (OD) in the range of about 6.55 inches to about 7.05 inches due to the presence of the inner gasket layer 130. However, removal of inner gasket layer 130 results in a second opening of diameter 120, which may allow, for example and without limitation, assembly 15 to thereby receive a pipe or pipe end having an OD in the range of about 7.04 inches to about 7.65 inches. However the diametrical dimensions and ranges of gaskets 125 and 125A may be modified in other embodiments for pipes of different size ranges.

In this embodiment, protrusions 161A, 161B and 161C of gasket layer 130 and cavities 162A, 162B and 162C of gasket layer 140 are circumferentially spaced about axis x-x, with protrusion 161A and cavity 162A angularly aligned 166A about 180° from radial gap 126, protrusion 161B and cavity 162B angularly aligned 166B about 45° from radial gap 126 on one side, and protrusion 161B and cavity 162B angularly aligned 166C about 45° from radial gap 126 on the other side. However, fewer or more retaining protrusions may be used and the spacing of such retaining elements about axis x-x may be varied. Furthermore, while in this embodiment the protrusions are provided on the outer circumferential surface of inner gasket 130 and corresponding cavities are provided on the inner circumferential surface of outer gasket 140, the cavities may be formed in the outer circumferential surface of inner gasket 130 and corresponding protrusions may be formed on the inner circumferential surface of outer gasket 140.

While inner circumferential surface 132 of inner gasket layer 130 is generally smooth in this embodiment, alternatively and without limitation it may be provided with ribs, projections, beads or grooves to provide an improved sealing connection with pipe 19. While outer circumferential surface 152, 156 of outer gasket layer 140 is formed with annular channel 160, alternatively and without limitation additional channels or grooves of alternative cross-sectional profiles may be employed for improved gasket compression and sealing. Furthermore, channel 160 may have a non-uniform width around the gasket circumference or may comprise multiple channels that each extends less than 180° of the outer circumference of the gasket when in place.

FIGS. 22-25 show alternative end gasket embodiment 225. Similar to end gasket 125, end gasket 225 comprises two nested gasket split-ring layers 230 and 240, with inner gasket layer 230 having three circumferentially spaced radially extending protrusions 261A, 261B and 261C interfacing with correspondingly circumferentially spaced radially inwardly extending cavities 262A, 262B and 262C in outer gasket layer 240.

However, in this embodiment, gasket layers 230 and 240 are attached to each other via adhesive layers 200A, 200B and 200C and inner gasket layer 230 includes separation areas 201A, 201B and 201C. In particular, and with reference to FIG. 23, each of cavities 262A, 262B and 262C in outer gasket layer 240 is defined by inwardly-facing frusto-conical side surface 202 and inwardly-facing circular bottom surface 203. Each of protrusions 261A, 261B and 261C of inner gasket layer 230 is defined by outwardly-facing frusto-conical side surface 204 and circular end surface 205. Adhesive layers 200A, 200B and 200C bond end surface 205 of protrusions 261A, 261B and 261C of inner gasket layer 130 to bottom surface 203 of cavities 262A, 262B and 262C in outer gasket layer 240, respectively.

The material strength of separation areas 201A, 201B and 201C of inner gasket layer 230 relative to the bonding strength of adhesive layers 200A, 200B and 200C is such that protrusions 261A, 261B and 261C will separate from the body of inner gasket layer 230 at separation areas 201A, 201B and 201C under an applied separation force between inner gasket layer 230 and outer gasket layer 240 prior to protrusions 261A, 261B and 261C separating from outer gasket layer 240 at bonded connections 200A, 200B and 200C.

When nested, protrusions 261A, 261B and 261C of gasket layer 230, bonded in cavities 262A, 262B and 262C of gasket layer 240, prevent rotational movement of gasket layers 230 and 240 relative to each other about axis x-x such that radial splits 226A and 226B are aligned on common radius 165 about axis x-x. Outer gasket layer 240 is configured to nest in annular pocket 21 of shell 16 along outer circumferential surface 252 and has inner circumferential surfaces 242 configured to engage either inner gasket layer 230, as shown in FIG. 22, or outer surface 122 of pipe 119 when inner gasket layer 230 is removed, as shown in FIG. 24.

Inner gasket layer 230 may be torn and separated from outer gasket layer 240 at separation areas 201A, 201B and 201C by pulling inner gasket layer 230 inwardly in a radial direction and then away from outer gasket layer 240 with a separation force greater than the tear strength of separation areas 201A, 201B and 201C. Accordingly, inner gasket layer 230 may be readily removed from outer gasket layer 240 in a manner such that protrusions 261A, 261B and 261C plug cavities 262A, 262B and 262C in inner circumferential surface 242 and such that inner circumferential surface 242 will form a continuous seal about pipe 119.

Inner gasket layer 230 may thereby be selectively disengaged from outer gasket layer 240 and removed from coupling assembly 115 to modify an effective range of pipe outer diameters that may be sealed by and accommodated within coupling assembly 115. Thus, removable inner gasket layer 230 enables modification of an effective diameter of coupling assembly 115.

Fewer or more retaining protrusions may be used and the spacing of such retaining elements about axis x-x may be varied. Furthermore, while in this embodiment the protrusions are provided on the outer circumferential surface of inner gasket 230 and corresponding cavities are provided on the inner circumferential surface of outer gasket 240, the cavities may be formed in the outer circumferential surface of inner gasket 230 and corresponding protrusions may be formed on the inner circumferential surface of outer gasket 240.

FIGS. 26-29 show alternative end gasket embodiment 325. Similar to end gasket 225, end gasket 325 comprises two nested gasket split-ring layers 330 and 340, with inner gasket layer 330 having three circumferentially spaced radially extending protrusions 361A, 361B and 361C interfacing with correspondingly circumferentially spaced radially inwardly extending cavities 362A, 362B and 362C in outer gasket layer 340, and inner gasket layer 330 having separation areas 201A, 201B and 201C.

However, in this embodiment, gasket layers 330 and 340 are attached to each other via a mechanical snap-like connection. In particular, and with reference to FIG. 27, each of cavities 362A, 362B and 362C in outer gasket layer 340 is defined by inwardly-facing frusto-conical side surface 302, outwardly-facing annular shoulder surface 303, inwardly-facing frusto-conical side surface 304, and inwardly-facing circular bottom surface 305. Each of protrusions 361A, 361B and 361C of inner gasket layer 330 is defined by outwardly-facing frusto-conical side surface 306, inwardly-facing annular flange surface 307, outwardly-facing frusto-conical side surface 308, and circular end surface 309. When protrusions 361A, 361B and 361C of inner gasket layer 330 are forced into and interface with cavities 362A, 362B and 362C in outer gasket layer 340, opposed annular surfaces 307 and 303 of protrusions 361A, 361B and 361C and cavities 362A, 362B and 362C, respectively, axially overlap. Such overlap restrains radial movement of protrusions 361A, 361B and 361C out of cavities 362A, 362B and 362C. Thus, annular shoulder 303 of cavities 362A, 362B and 362C faces opposed annular flange 307 of protrusions 361A, 361B and 361C to form gasket layer connections 300A, 300B and 300C, respectively.

The material strength of separation areas 301A, 301B and 301C of inner gasket layer 330 relative to the strength of mechanical connections 300A, 300B and 300C is such that protrusions 361A, 361B and 361C will separate from the body of inner gasket layer 330 at separation areas 301A, 301B and 301C under an applied separation force between inner gasket layer 330 and outer gasket layer 340 prior to protrusions 361A, 361B and 361C separating from outer gasket layer 340 at overlap connections 300A, 300B and 300C.

When nested, protrusions 361A, 361B and 361C of gasket layer 330, held by overlaps 300A, 300B and 300C in cavities 262A, 262B and 262C of gasket layer 340, prevent rotational movement of gasket layers 330 and 340 relative to each other about axis x-x such that radial splits 326A and 326B are aligned on common radius 165 about axis x-x. Outer gasket layer 340 is configured to nest in annular pocket 21 of shell 16 along outer circumferential surfaces 352 has inner circumferential surfaces 342 configured to engage either inner gasket layer 330, as shown in FIG. 26, or outer surface 122 of pipe 119 when inner gasket layer 330 is removed, as shown in FIG. 28.

Inner gasket layer 330 may be torn or detached from outer gasket layer 340 at separation areas 301A, 301B and 301C by pulling inner gasket layer 330 inwardly in a radial direction and then away from outer gasket layer 340 with a separation force greater than the tear strength of separation areas 301A, 301B and 301C. Accordingly, inner gasket layer 330 may be readily removed from outer gasket layer 340 in a manner such that protrusions 361A, 361B and 361C plug cavities 362A, 362B and 362C in inner circumferential surface 342 and such that inner circumferential surface 342 will form a continuous seal about pipe 119.

Inner gasket layer 330 may thereby be selectively disengaged from outer gasket layer 340 and removed from coupling assembly 115 to modify an effective range of pipe outer diameters that may be sealed by and accommodated within coupling assembly 115. Thus, removable inner gasket layer 330 enables modification of an effective diameter of coupling assembly 115.

Fewer or more retaining protrusions may be used and the spacing of such retaining elements about axis x-x may be varied. Other mechanical connections or retaining configurations may be used to retain protrusions 361A, 361B and 361C in cavities 362A, 362B and 362C. Furthermore, while in this embodiment the protrusions are provided on the outer circumferential surface of inner gasket 330 and corresponding cavities are provided on the inner circumferential surface of outer gasket 340, the cavities may be formed in the outer circumferential surface of inner gasket 330 and corresponding protrusions may be formed on the inner circumferential surface of outer gasket 340.

FIGS. 30-36 show alternative end gasket embodiment 425. Similar to end gasket 225, end gasket 425 comprises two nested gasket split-ring layers 430 and 440, with inner gasket layer 430 having three circumferentially spaced radially extending protrusions 461A, 461B and 461C interfacing with correspondingly circumferentially spaced radially inwardly extending cavities 462A, 462B and 462C in outer gasket layer 440.

Figure 31:
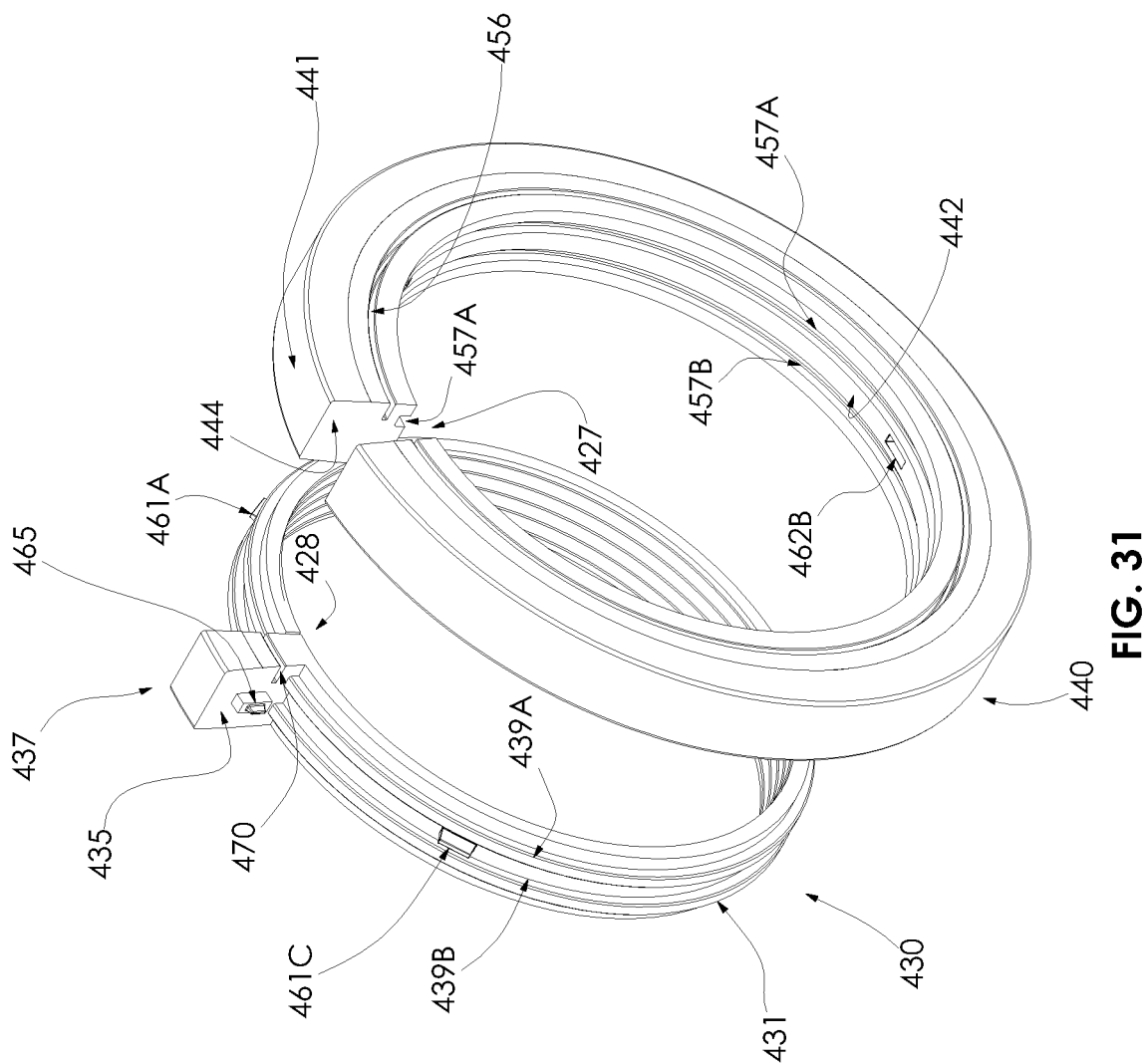
FIG. 31 is an exploded perspective view of the end gasket shown in FIG. 30.
Figure 32:
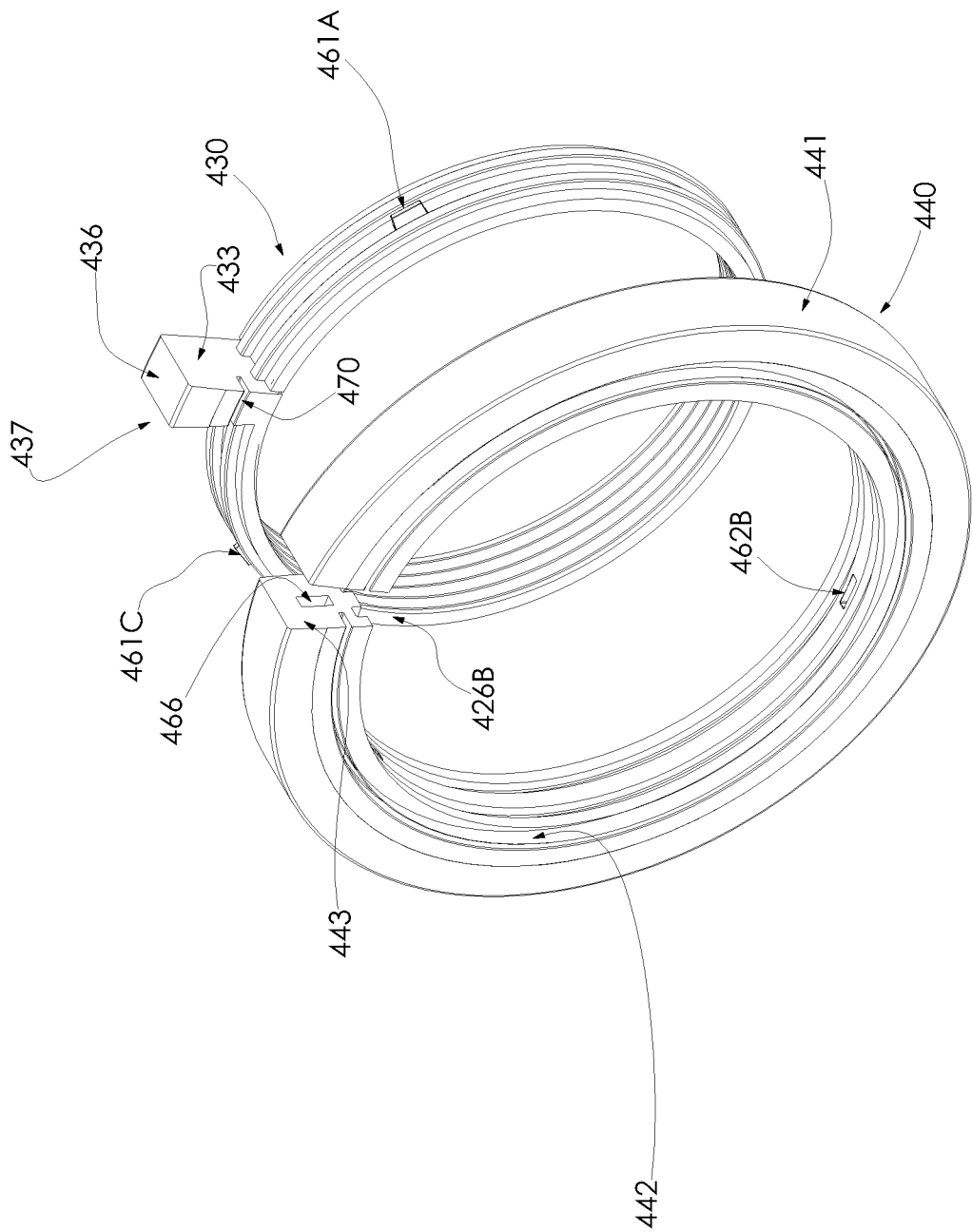
FIG. 32 is a right perspective view of the end gasket shown in FIG. 31.
Figure 36:
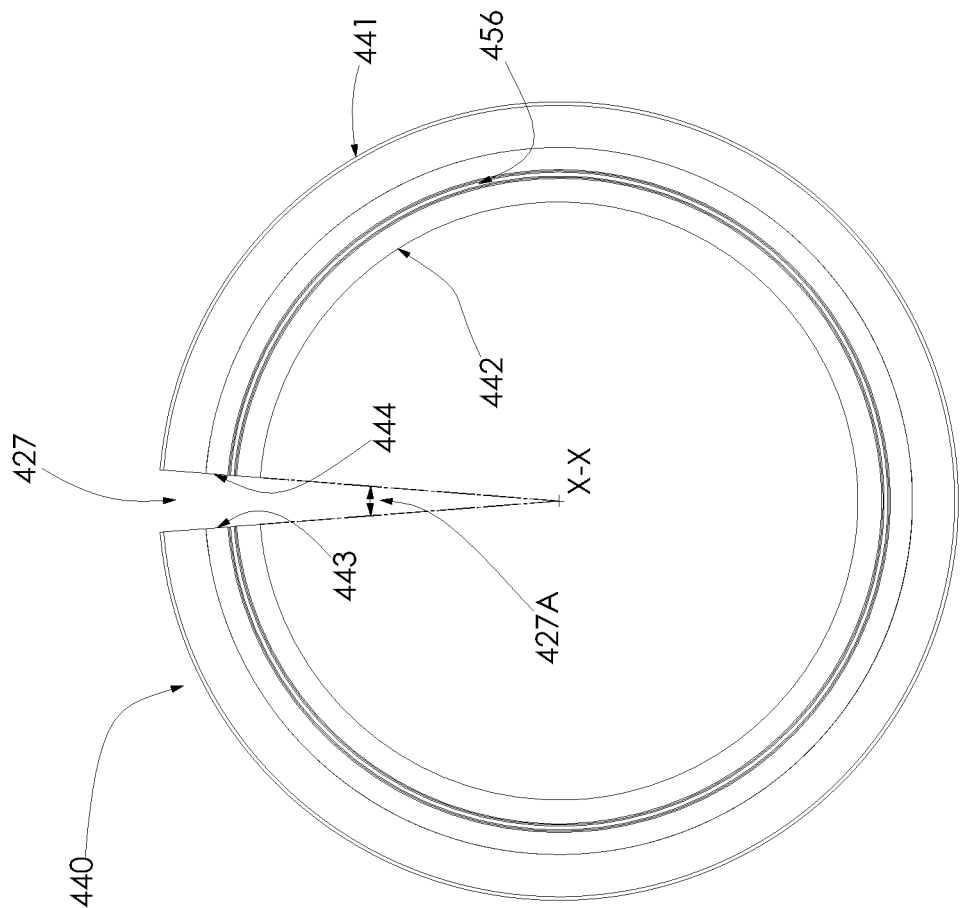
FIG. 36 is a side view of the outer gasket layer shown in FIG. 31

As shown in FIGS. 31, 32 and 36, outer split ring gasket 440 is a specially-configured ring-shaped solid penannular member elongated along axis x-x having outer circumferential surface 441 and inner circumferential surface 442. Inner cylindrical surface 442 of outer gasket 440 includes first annular channel 457A and second annular channel 457B extending inwardly from inner circumferential surface 442 of outer gasket 430.

Figure 35:
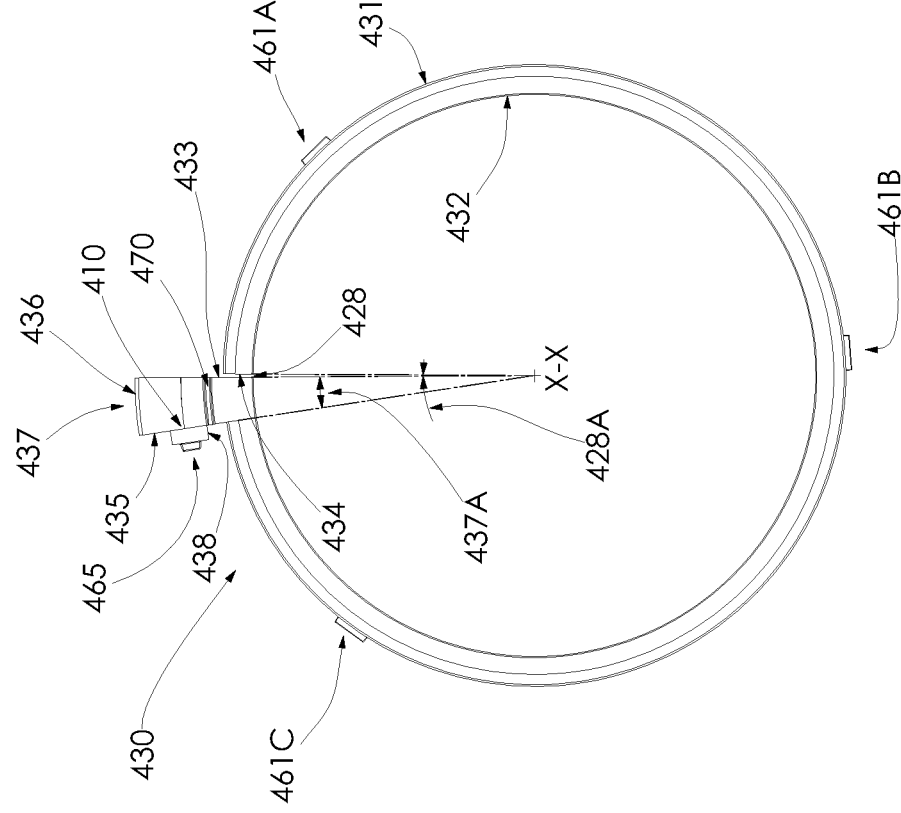
FIG. 35 is a side view of the inner gasket layer shown in FIG. 31.

As shown in FIGS. 31, 32 and 35, inner split ring gasket 430 is a specially-configured ring-shaped solid penannular member elongated along axis x-x having outer circumferential surface 431 and inner circumferential surface 432. Outer cylindrical surface 431 of inner gasket 430 includes first spline 439A and second spline 439B extending outwardly from outer circumferential surface 431 of inner gasket 430. Splines 439A and 439B of inner gasket 430 are orientated in a plane substantially perpendicular to axis x-x and mate with channels 457A and 457B of outer gasket 440, respectively.

Split-ring end gasket 425 is formed of a resilient material and is cut radially so as to be penannular and not form a full ring. Thus, instead of being a full continuous annular ring, radial break or gap 426 is provided through each layer 430 and 440 at a circumferential location. Thus, each layer 430 and 440 has radial split 426A and 426B, respectively, through the entire gasket cross-section when nested. The edges of gap 426 may thereby be manually separated or pulled apart from each other to form a more open C-shaped member. This gap is increased such that it is greater than outer diameter 20 of pipe 19 so that end gasket 425 can be installed on or fit around outer diameter 20 of pipe 19. Once installed on pipe 19, the opposed ends of the split-rings 430 and 440 will move back towards each other and gap 426 will close up.

However, in this embodiment, radial split 426 is defined between radially extending side wall 433 of inner gasket layer 430 on one side and radially extending sidewalls 434 and 444 of inner gasket layers 430 and 440, respectively, on the other side.

As shown, when not nested, outer gasket layer 440 has a radial split or gap 427 between radial sidewall 443 on one side and radial sidewall 444 on the other side of outer gasket layer 440. In this embodiment, gap 427 is an annulus sector defined by central angle 427A about center axis x-x. When not nested, gasket layer 430 has a radial split or gap 428 between radial sidewall 433 on one side and radial sidewall 434 on the other side of inner gasket layer 430. In this embodiment, gap 428 is an annulus sector defined by central angle 428A about center axis x-x. Central angle 428A of gap 428 of inner gasket layer 430 is significantly less than central angle 427A of gap 427 of outer gasket layer 440.

Inner gasket layer 430 includes a specially formed radial flange extension 437 having radial sidewall 435, radial sidewall 433 and outer arc surface 436. In this embodiment, extension 437 generally forms an annulus sector defined by central angle 437A. Central angle 437A of radial flange extension 437 of inner gasket layer 430 is substantially the same as central angle 427A of gap 427 of outer gasket layer 440.

Inner split-ring 430 and outer split-ring 440 are also loosely connected to each other via extension 437 of inner gasket layer 430 being nested in gap 427 of outer gasket layer 440 such that extension 437 of inner split-ring 430 is annularly wedged between sidewalls 443 and 444 of outer gasket layer 440. In addition, sidewall 435 of radial extension 437 of inner gasket layer 430 includes stepped protrusion 465 interfacing with correspondingly radially spaced and stepped inwardly-extending cavity 466 in sidewall 443 of outer gasket layer 440. Protrusion 465 of extension 437 of gasket layer 430 mates with cavity 466 in outer gasket layer 440 to retain gasket layers 430 and 440 in radial alignment from longitudinal axis x-x.

Additional radial retaining protrusions and cavities may be used and the spacing of such retaining elements from axis x-x may be varied. The profile of such protrusions and cavities may also be varied. Furthermore, while in this embodiment protrusion 465 is provided on the sidewall surface 435 of extension 437 of inner gasket 430 and corresponding cavity 466 is provided on the sidewall surface 443 of outer gasket 440, the cavity or cavities may be formed in the sidewall surface 435 of extension 437 of inner gasket 430 and the corresponding protrusion or protrusions may be formed on the sidewall 443 of outer gasket layer 440.

Extension 437 of inner gasket layer 430 is configured to nest in gap 427, with two-step protrusion 465 received in corresponding cavity 466 of outer gasket 440. Accordingly, inner gasket layer 430 may be readily removed from and reinserted into outer gasket layer 440. By positioning inner gasket layer 430 within outer gasket layer 440 with extension 437 and protrusion 465 of inner gasket layer 430 aligned in gap 427 with cavity 466 of outer gasket 440, respectively, outer and inner gasket layers 430 and 440 are both held together by their own resiliency, although gasket layers 430 and 440 may be separated by pulling inner gasket layer 430 away from outer gasket layer 440 annularly and then inwardly in a radial direction from outer gasket layer 440.

Furthermore, gasket layers 430 and 440 may be further attached to each other via adhesive layer 400 between protrusion 465 of inner gasket layer 430 and cavity 466 of outer gasket 440. Extension 437 of inner gasket layer 430 includes separation area 410. Adhesive layer 400 bonds the end surface of protrusion 465 of inner gasket layer 430 to the inner surface of cavity 466 in outer gasket layer 440. The material strength of separation area 410 of inner gasket layer 430 relative to the bonding strength of adhesive layer 400 is such that protrusion 465 will separate from extension 437 of inner gasket layer 430 at separation area 400 under an applied separation force between inner gasket layer 430 and outer gasket layer 440 prior to protrusion 465 separating from outer gasket layer 440 at bonded connection 400.

Inner gasket layer 430 may be torn or detached from outer gasket layer 440 at its separation areas by pulling inner gasket layer 430 away from outer gasket layer 440 with a separation force greater than the tear strength of the separation areas, including separation area 410. Accordingly, inner gasket layer 430 may be readily removed from outer gasket layer 440 in a manner such that protrusion 465 plugs cavity 466.

Inner gasket layer 430 may thereby be selectively disengaged from outer gasket layer 440 and removed from coupling assembly 115 to modify an effective range of pipe outer diameters that may be sealed by and accommodated within coupling assembly 115. Thus, removable inner gasket layer 430 enables modification of an effective diameter of coupling assembly 115.

Thus, for pipe 19 having smaller outer diameter 20, inner and outer split-rings 430 and 440 are nested and used together. For pipes 119 of greater outer diameter 120, inner split-ring 430 is manually separated from outer split-ring 440 and just outer split-ring 440 is used as the end gasket. Accordingly, gasket 425 includes penannular outer gasket layer 440 and separate penannular inner gasket layer 430 that is insertable into and removable from outer gasket layer 440. Gasket 425 defines a gasket opening orientated about longitudinal axis x-x. Alternatively, a mechanical connection or other retaining configurations may be used to retain protrusion 465 in cavity 466.

As shown, outer gasket layer 440 includes pressure assist annular groove 456 to aid in sealing to pipe 19 or 119 under compressive pressure. As shown, extension 470 of inner gasket layer 430 includes annular groove 470 corresponding in radius and axial depth to annular groove 456 in outer gasket layer 440. As with annular groove 456 of outer gasket layer 440, groove 470 provides volumetric space for gasket 440 to move into as sleeve 16 is tightened to pipe 19 and gasket 425 is radially compressed between shell 16 and pipe 19, facilitating an improved seal.

The present invention contemplates that many changes and modifications may be made. Therefore, while forms of the improved coupling assembly has been shown and described, and a number of alternatives discussed, persons skilled in this art will readily appreciate that various additional changes and modifications may be made without departing from the scope of the invention, as defined and differentiated by the claims.

What is claimed is:

1. A conduit coupling assembly configured to clamp to a fluid conduit oriented about a longitudinal axis comprising:
   a first arcuate sleeve member;
   a second arcuate sleeve member;
   a connecting assembly coupling the first sleeve member to the second sleeve member and configured to tighten said first and second sleeve members to a fluid conduit from a non-actuated position to a tightened position;
   an arcuate radial-split gasket configured to be positioned between said first and second sleeve members and said fluid conduit;
   said gasket comprising an outer gasket layer configured to provide a seal under compression and a separate inner gasket layer configured to provide a seal under compression;
   said inner and outer gasket layers configured to be selectively engaged with each other;
   said outer gasket layer having an inner circumferential surface, an outer circumferential surface, and a radial gap extending between said inner circumferential surface and said outer circumferential surface of said outer gasket layer;
   said radial gap of said outer gasket layer defined by a first radial side wall gap surface and a second radial side wall gap surface;
   said inner gasket layer having an inner circumferential surface, an outer circumferential surface, and a radial gap extending between said inner circumferential surface and said outer circumferential surface of said inner gasket layer;
   said outer circumferential surface of said inner gasket layer configured to selectively engage said inner circumferential surface of said outer gasket layer;
   said inner gasket layer having a radial insert defined by a first radial side wall insert surface and a second radial side wall insert surface;
   said radial insert of said inner gasket layer extending radially outward from said outer circumferential surface of said inner gasket layer; and
   said radial insert of said inner gasket layer configured to be received in said radial gap of said outer gasket layer between said first radial side wall gap surface and said second radial side wall gap surface.

2. The coupling assembly set forth in claim 1, wherein said first radial side wall insert surface of said radial insert of said inner gasket layer or said first radial side wall gap surface of said radial gap of said outer gasket layer comprises a retaining protrusion interfacing between said inner and outer gasket layers.

3. The coupling assembly set forth in claim 2, wherein said first radial side wall insert surface of said radial insert of said inner gasket layer or said first radial side wall gap surface of said radial gap of said outer gasket layer comprises a retaining cavity configured to receive said retaining protrusion of said other of said first radial side wall insert surface of said radial insert of said inner gasket layer or said first radial side wall gap surface of said radial gap of said outer gasket layer.

4. The coupling assembly set forth in claim 3, comprising an adhesive between said retaining protrusion and an inner cavity surface of said retaining cavity.

5. The coupling assembly set forth in claim 3, wherein said first radial side wall insert surface of said radial insert of said inner gasket layer comprises said retaining protrusion and said first radial side wall gap surface of said radial gap of said outer gasket layer comprises said retaining cavity.

6. The coupling assembly set forth in claim 1, comprising a gasket layer connection between said first radial side wall insert surface of said radial insert of said inner gasket layer and said first radial side wall gap surface of said radial gap of said outer gasket layer.

7. The coupling assembly set forth in claim 6, wherein said gasket layer connection comprises a retaining surface overlap between an insert retaining surface of said first radial side wall insert surface of said radial insert of said inner gasket layer and a gap retaining surface of said first radial side wall gap surface of said radial gap of said outer gasket layer that restrains radial movement of said radial insert of said inner gasket layer from said radial gap of said outer gasket layer.

8. The coupling assembly set forth in claim 1, wherein:
said inner circumferential surface of said outer gasket layer or said outer circumferential surface of said inner gasket layer comprises a plurality of circumferentially spaced retaining protrusions interfacing between said inner and outer gasket layers;
each of said plurality of circumferentially spaced retaining protrusions having an engagement portion and a separation portion;
said engagement portion of said retaining protrusions of one of said outer or inner gasket layer connected to said other of said outer gasket layer or said inner gasket layer by a gasket layer connection; and
said gasket layer connection configured such that said engagement portion of said retaining protrusions will separate from said outer or inner gasket layer at said separation portion under a separation force prior to said engagement portion separating from said outer or inner gasket layer.

9. The coupling assembly set forth in claim 8, wherein said gasket layer connection comprises an adhesive between a retaining surface of said engagement portion of said retaining protrusions of said subject outer or inner gasket layer and said other of said outer gasket layer or said inner gasket layer.

10. The coupling assembly set forth in claim 9, wherein said outer circumferential surface of said inner gasket layer comprises said retaining protrusions, said inner circumferential surface of said outer gasket layer comprises a plurality of circumferentially spaced cavities configured to receive said retaining protrusions of said inner gasket layer, and said gasket layer connection comprises an adhesive between said retaining surface of said engagement portion of said retaining protrusions of said inner gasket layer and an inner cavity surface of said cavities of said outer gasket layer.

11. The coupling assembly set forth in claim 8, wherein said gasket layer connection comprises a mechanical connection between said engagement portion of said retaining protrusions of said subject outer or inner gasket layer and said other of said outer gasket layer or said inner gasket layer.

12. The coupling assembly set forth in claim 11, wherein said outer circumferential surface of said inner gasket layer comprises said retaining protrusions, said inner circumferential surface of said outer gasket layer comprises a plurality of circumferentially spaced cavities configured to receive said retaining protrusions of said inner gasket layer, and said gasket layer connection comprises a retaining surface overlap between a retaining surface of said engagement portion of said retaining protrusions of said inner gasket layer and a cavity surface of said cavities of said outer gasket layer that restrains radial movement of said retaining protrusions of said inner gasket layer from said cavities of said outer gasket layer.

13. The coupling assembly set forth in claim 12, wherein said retaining surface overlap comprises an annular shoulder of said cavity surface of said cavities facing an opposed annular flange of said retaining surface of said engagement portion of said retaining protrusions.

* * * * *